US012729550B2

(12) United States Patent
Asakura

(10) Patent No.: US 12,729,550 B2
(45) Date of Patent: Sep. 8, 2026

(54) REBAR TYING TOOL

(71) Applicant: MAKITA CORPORATION, Anjo (JP)

(72) Inventor: Yuta Asakura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 319 days.

(21) Appl. No.: 18/440,045

(22) Filed: Feb. 13, 2024

(65) Prior Publication Data

US 2024/0271438 A1 Aug. 15, 2024

(30) Foreign Application Priority Data

Feb. 14, 2023 (JP) ................................ 2023-021117

(51) Int. Cl.

| | |
|---|---|
| ***E04G 21/12*** | (2006.01) |
| ***B25B 25/00*** | (2006.01) |
| ***B65B 13/18*** | (2006.01) |
| ***B65B 13/28*** | (2006.01) |

(52) U.S. Cl.

CPC ............ *E04G 21/123* (2013.01); *B25B 25/00* (2013.01); *B65B 13/18* (2013.01); *B65B 13/285* (2013.01); *E04G 21/122* (2013.01)

(58) Field of Classification Search

CPC ...... E04G 21/123; B65B 13/18; B65B 13/285
See application file for complete search history.

(56) References Cited

U.S. PATENT DOCUMENTS 7,255,135 B2 * 8/2007 Ishikawa ................. B65B 13/28 140/57
10,570,620 B2 * 2/2020 Matsuno ................. B21F 15/04
2009/0283171 A1 * 11/2009 Nagaoka ............... E04G 21/122 29/33 F
2021/0245229 A1 * 8/2021 Yoshida .................. B21F 15/04

FOREIGN PATENT DOCUMENTS

JP 2009-275486 A 11/2009

* cited by examiner

*Primary Examiner* — Christopher L Templeton
*Assistant Examiner* — Matthew Stephens
(74) *Attorney, Agent, or Firm* — Oliff PLC

(57) ABSTRACT

A rebar tying tool may include: a screw shaft configured to rotate; a sleeve through which the screw shaft is inserted, and configured to move in a front-rear direction and rotate; a fin member attached to the sleeve and configured to permit and prohibit rotation of the sleeve; a push member attached to the sleeve and configured to rotate about the sleeve, wherein the push member does not rotate along with the rotation of the sleeve; an operated unit having a longitudinal direction in the front-rear direction and configured to be operated by the push member when the sleeve moves in the front-rear direction; and a grasping unit protruding from a front part of the sleeve, configured to rotate with the sleeve, and configured to grasp the wire. The push member may be disposed on a front side relative to the fin member.

7 Claims, 21 Drawing Sheets

REBAR TYING TOOL

REFERENCE TO RELATED APPLICATIONS

This application claims priority to Japanese Patent Application No. 2023-021117, filed on Feb. 14, 2023, the entire contents of which are hereby incorporated by reference into the present application.

TECHNICAL FIELD

This disclosure herewith relates to a rebar tying tool.

BACKGROUND ART

Japanese Patent Application Publication No. 2009-275486 describes a rebar tying tool. The rebar tying tool is configured to tie rebars with a wire. The rebar tying tool comprises a screw shaft configured to rotate, a sleeve through which the screw shaft is inserted and configured to move in a front-rear direction and rotate, a fin member attached to the sleeve and configured to permit and prohibit rotation of the sleeve, a push member attached to the sleeve and configured to rotate around the sleeve, wherein the push member does not rotate along with the rotation of the sleeve, an operated unit having a longitudinal direction in the front-rear direction and configured to be operated by the push member when the sleeve moves in the front-rear direction, and a grasping unit protruding from a front part of the sleeve, configured to rotate with the sleeve, and configured to grasp the wire. The push member is disposed on a rear side relative to the fin member.

SUMMARY

In the rebar tying tool as mentioned above, typically, the operated member is often disposed on a front side relative to the push member. Since the operated unit operates by being operated by the push member, a space required for disposing the operated unit needs to be designed based on positions of the operated unit before and after its operation. It has been desired that the space required for disposing the operated unit be reduced for higher degree of freedom in the arrangement of the operated unit. The present teachings disclose an art that allows to improve degree of freedom in arrangement of an operated unit.

A rebar tying tool disclosed herein may be configured to tie rebars with a wire. The rebar tying tool may comprise: a screw shaft configured to rotate; a sleeve through which the screw shaft is inserted, and configured to move in a front-rear direction and rotate; a fin member attached to the sleeve and configured to permit and prohibit rotation of the sleeve; a push member attached to the sleeve and configured to rotate about the sleeve, wherein the push member does not rotate along with the rotation of the sleeve; an operated unit having a longitudinal direction in the front-rear direction and configured to be operated by the push member when the sleeve moves in the front-rear direction; and a grasping unit protruding from a front part of the sleeve, configured to rotate with the sleeve, and configured to grasp the wire. The push member may be disposed on a front side relative to the fin member.

According to the above configuration, since the push member is disposed on the front side relative to the fin member, a space required for disposing the operated unit can be reduced in the front-rear direction as compared to a configuration where the push member is disposed on a rear side relative to the fin member. Due to this, degree of freedom in arrangement of the operated unit can be improved.

DESCRIPTION

Figure 1:
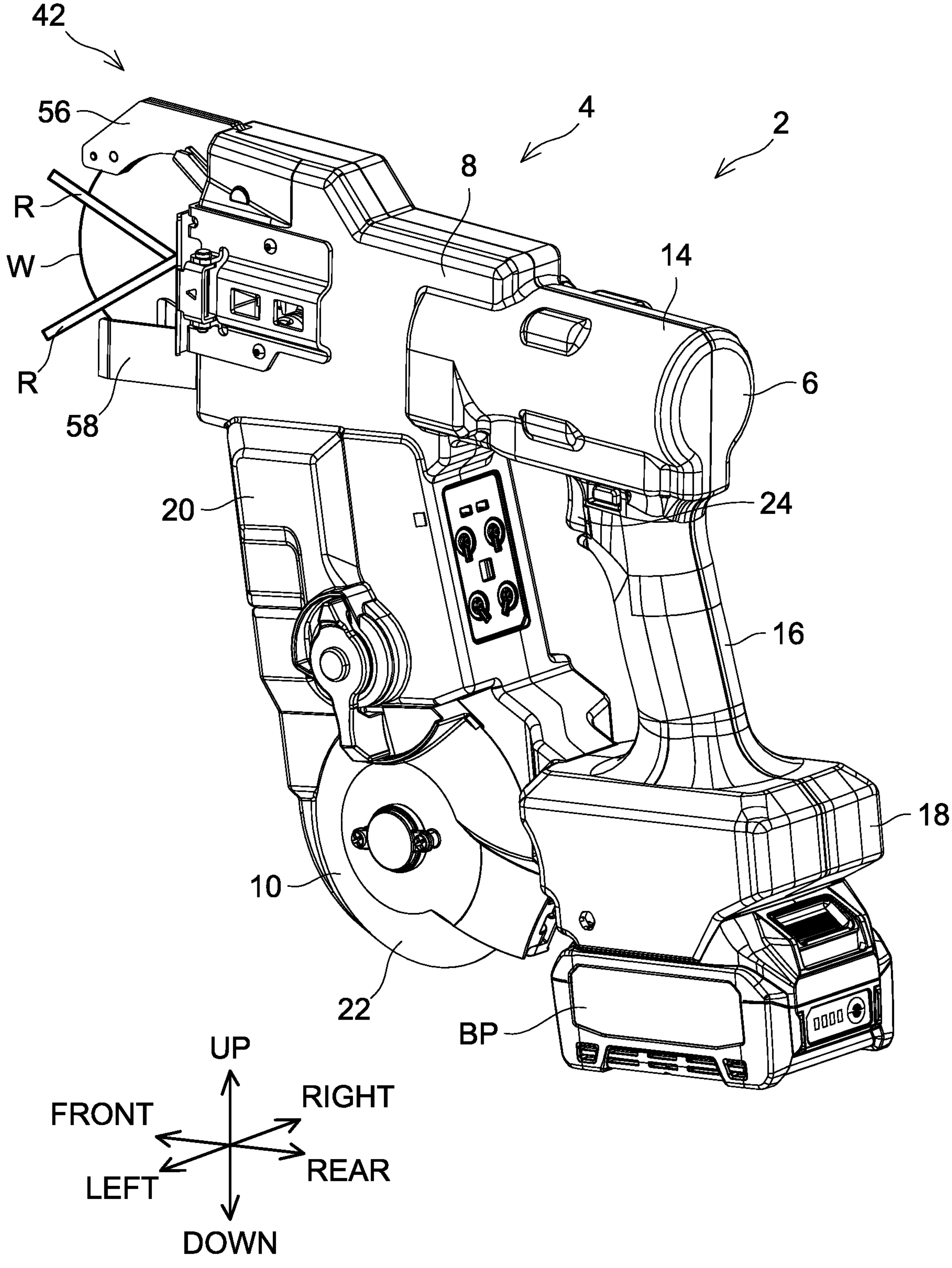
FIG. 1 illustrates a perspective view of a rebar tying tool 2 according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved rebar tying tools, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the operated unit may comprise: an operated member which the push member is configured to contact and configured to be operated by the push member when the push member is in contact with the operated member; and a cutter configured to cut the wire and work when the operated member is operated by the push member.

The cutter needs to be disposed in proximity to the wire in order to cut the wire. According to the above configuration, since the push member is disposed on the front side relative to the fin member, a distance between the push member and the rebars can be decreased as compared to a configuration where the push member is disposed on the rear side relative to the fin member. Due to this, the operated unit can be made smaller in the front-rear direction.

In one or more embodiments, the operated unit may further comprise a link member connecting the operated member and the cutter.

According to the above configuration, the link member can be made smaller in the front-rear direction as compared to the configuration where the push member is disposed on the rear side relative to the fin member.

In one or more embodiments, the push member may be clamped between the sleeve and the fin member in the front-rear direction.

According to the above configuration, the push member can be attached to the sleeve with a simple configuration.

In one or more embodiments, the rebar tying tool may further comprise a trigger configured to be pushed into by a user. The trigger may be aligned with the operated unit in the front-rear direction when the rebar tying tool is viewed in a direction perpendicular to the front-rear direction.

According to the above configuration, the rebar tying tool can be suppressed from being large in a direction perpendicular to the front-rear direction as compared to a configuration where the trigger is not aligned with the operated unit in the front-rear direction when the rebar tying tool is seen along the direction perpendicular to the front-rear direction.

First Embodiment

As shown in FIG. 1, a rebar tying tool 2 is configured to tie plural rebars R with a wire W. In the rebar tying tool 2, the wire W of various diameters (e.g., diameter 0.5 mm to diameter 2.5 mm) can be implemented depending on a diameter of the rebars R to be used. For example, when rebars R with a small diameter of 16 mm or less are to be tied, the wire W with a diameter of 1.6 mm or less (e.g., 0.8 mm) is used, while when rebars R with a large diameter greater than 16 mm (e.g., 25 mm or 32 mm) are to be tied, the wire W with a diameter greater than 1.6 mm (e.g., 2.0 mm) is used. Hereafter, when a longitudinal direction of a twisting unit 46 (see FIG. 8) will be referred to as a front-rear direction, a direction perpendicular to the front-rear direction will be referred to as an up-down direction, and a direction perpendicular to the front-rear direction and the up-down direction will be referred to as a left-right direction.

The rebar tying tool 2 comprises a body 4 and a battery pack BP. The body 4 comprises a right-side housing 6 defining an outer shape of a right-half surface of the body 4, a left-side housing 8 defining an outer shape of a left-half surface of the body 4, and a reel cover 10 attached rotatably to a front lower part of the left-side housing 8.

The body 4 comprises a twisting unit accommodating portion 14, a grip portion 16, a battery receptacle 18, a feeding unit accommodating portion 20, and a reel accommodating portion 22. The twisting unit accommodating portion 14, the grip portion 16, the battery receptacle 18, and the feeding unit accommodating portion 20 are composed of the right-side housing 6 and the left-side housing 8. The reel accommodating portion 22 is composed of the right-side housing 6, the left-side housing 8, and the reel cover 10.

Figure 2:
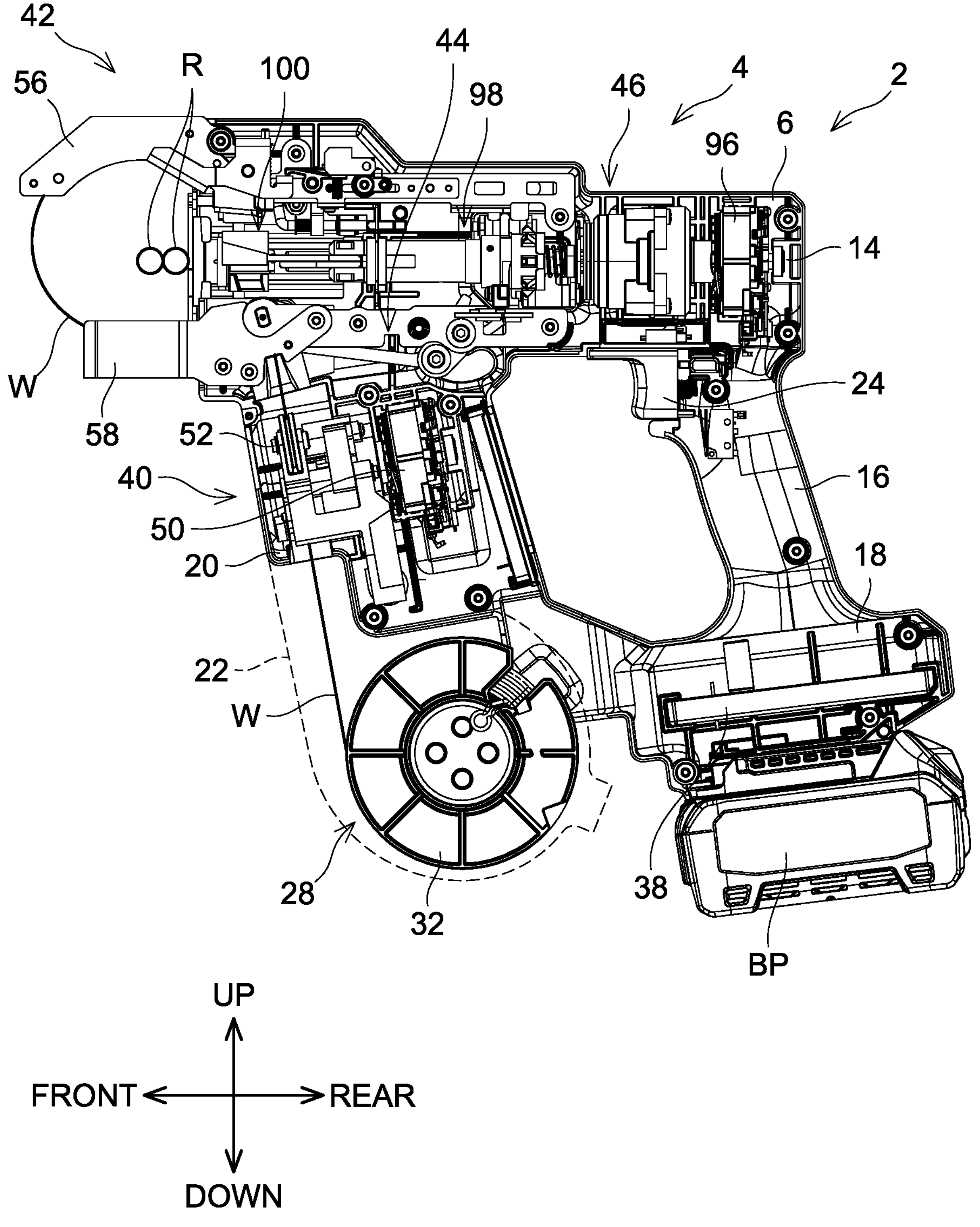
FIG. 2 illustrates a left side view of the rebar tying tool 2 according to the first embodiment with a left-side housing 8 and a reel cover 10 removed.

As shown in FIG. 2, the twisting unit accommodating portion 14 extends in the front-rear direction. The grip portion 16 is arranged below a rear side of the twisting unit accommodating portion 14. The grip portion 16 is configured to be gripped by a user. A longitudinal direction of the grip portion 16 is inclined slightly relative to the up-down direction. A trigger 24 is attached to an upper part of a front surface of the grip portion 16.

The battery receptacle 18 is arranged at a lower end of the grip portion 16. The battery pack BP is removably attached to a lower end of the battery receptacle 18. The battery pack BP is attached to the battery receptacle 18 by being slid front-downward relative to the battery receptacle 18 and the battery pack BP is removed from the battery receptacle 18 by being slid rear-upward relative to the battery receptacle 18. A sliding direction of the battery pack BP is inclined relative to the front-rear direction. The battery pack BP comprises for example a secondary battery such as a lithium-ion battery.

The feeding unit accommodating portion 20 is arranged below a front side of the twisting unit accommodating portion 14. The feeding unit accommodating portion 20 is disposed forward of the grip portion 16.

Figure 3:
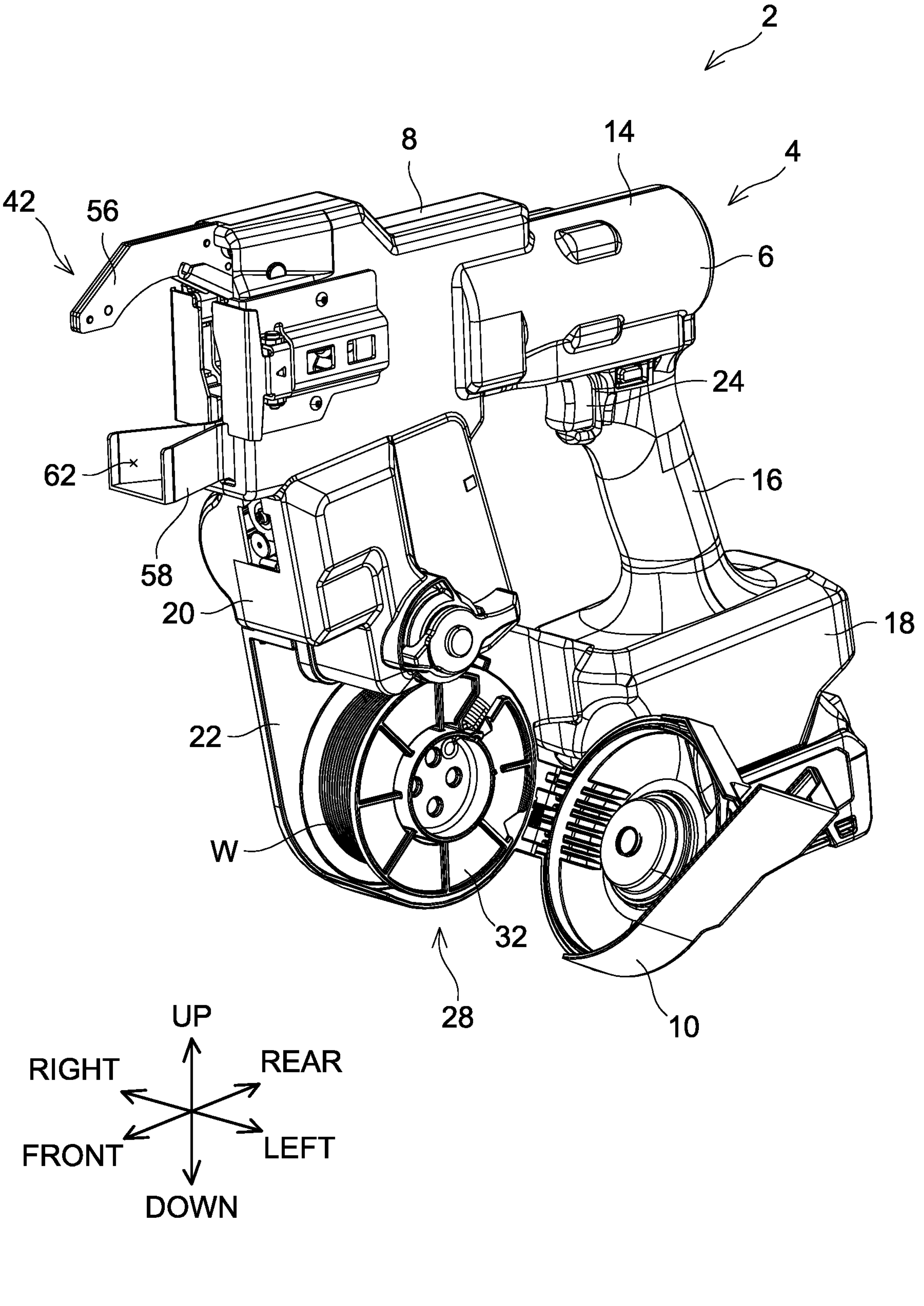
FIG. 3 illustrates a perspective view of the rebar tying tool 2 according to the first embodiment with the reel cover 10 open.

The reel accommodating portion 22 is disposed at a lower end of the feeding unit accommodating portion 20. In FIG. 2, the reel accommodating portion 22 is depicted in a broken line. As shown in FIG. 3, the reel accommodating portion 22 is configured to accommodate a reel 28. The reel 28 comprises the wire W and a bobbin 32 on which the wire W is wound. The reel 28 is supported rotatably by the reel accommodating portion 22. The reel 28 can be detached and attached from and to the reel accommodating portion 22 when the reel cover 10 is open relative to the left-side housing 8.

Figure 10:
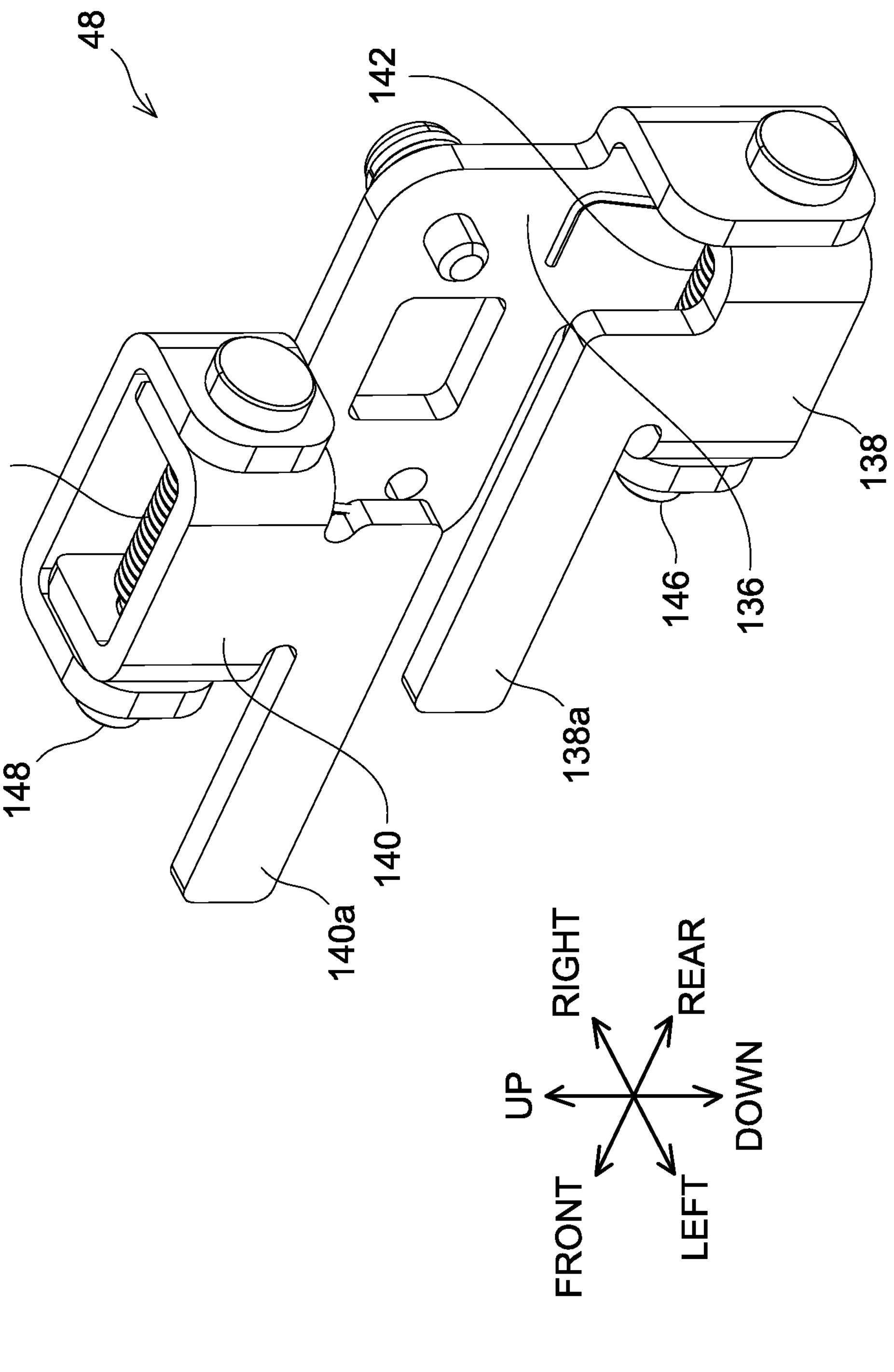
FIG. 10 illustrates a perspective view of a rotation limiting unit 48 according to the first embodiment.

As shown in FIG. 2, the rebar tying tool 2 comprises a control unit 38, a feeding unit 40, the guiding unit 42, the cutting unit 44, the twisting unit 46, and the rotation limiting unit 48 (see FIG. 10).

The control unit 38 is accommodated in the battery receptacle 18. The control unit 38 is configured to perform tying operation of tying the rebars R with the wire W when the trigger 24 is pressed in by the user.

The feeding unit 40 is accommodated in the feeding unit accommodating portion 20. The feeding unit 40 comprises a feeding motor 50 and a feeding roller unit 52. The feeding motor 50 is for example a brushless motor. The feeding motor 50 rotates with power supplied from the battery pack BP. When the feeding motor 50 rotates, the feeding roller unit 52 operates. The feeding roller unit 52 rotates to pull the wire W from the bobbin 32 and feed the wire W front-upward toward the rebars R. Also, the feeding roller unit 52 rotates to pull back the wire W toward the bobbin 32.

Figure 4:
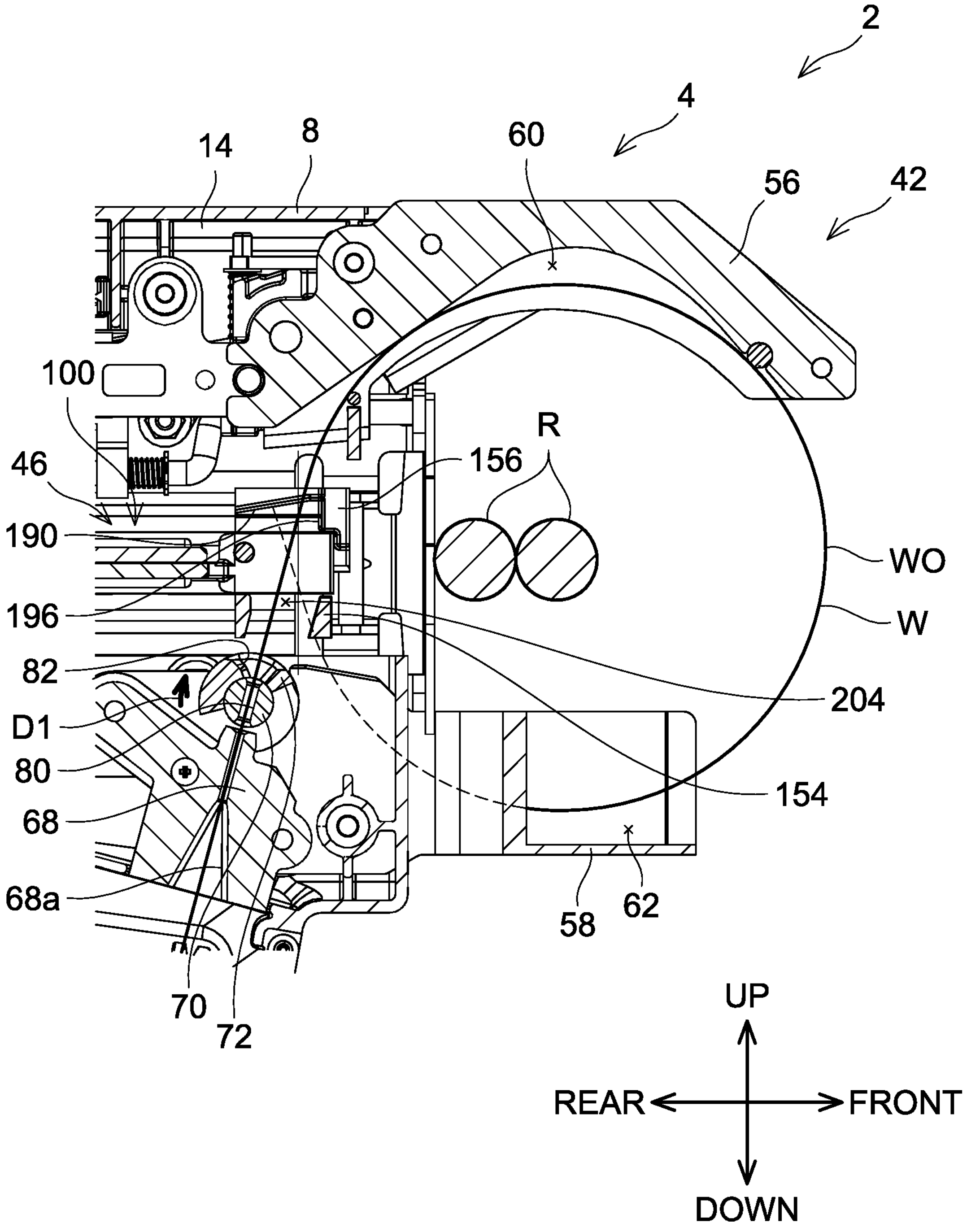
FIG. 4 illustrates a cross-sectional view of the rebar tying tool 2 according to the first embodiment, seeing a guiding unit 42 and its proximity.

The guiding unit 42 is fixed to a front end of the twisting unit accommodating portion 14. The guiding unit 42 comprises an upper curl guide 56 and a lower curl guide 58. As shown in FIG. 4, the upper curl guide 56 has an open bottom. The upper curl guide 56 comprises an upper wire passage 60 having a curve shape convex upward. The lower curl guide 58 is arranged below the upper curl guide 56. The lower curl guide 58 has an open top. The lower curl guide 58 comprises a lower wire passage 62.

The wire W fed by the feeding unit 40 (see FIG. 2) is directed into the upper wire passage 60. When the wire W passes in the upper wire passage 60 from rear to front, the wire W is given a downward curl by the upper curl guide 56. The wire W having passed in the upper wire passage 60 is then directed into the lower wire passage 62. After the wire W passes in the lower wire passage 62 from front to rear, the wire W is then directed rear-upward. The wire W is guided by the upper curl guide 56 and the lower curl guide 58, by which the wire W is wrapped around the rebars R. Hereafter, a track on which a tip of the wire W moves by being guided by the upper curl guide 56 and the lower curl guide 58 may be referred to as a wrapping track WO.

Figure 5:
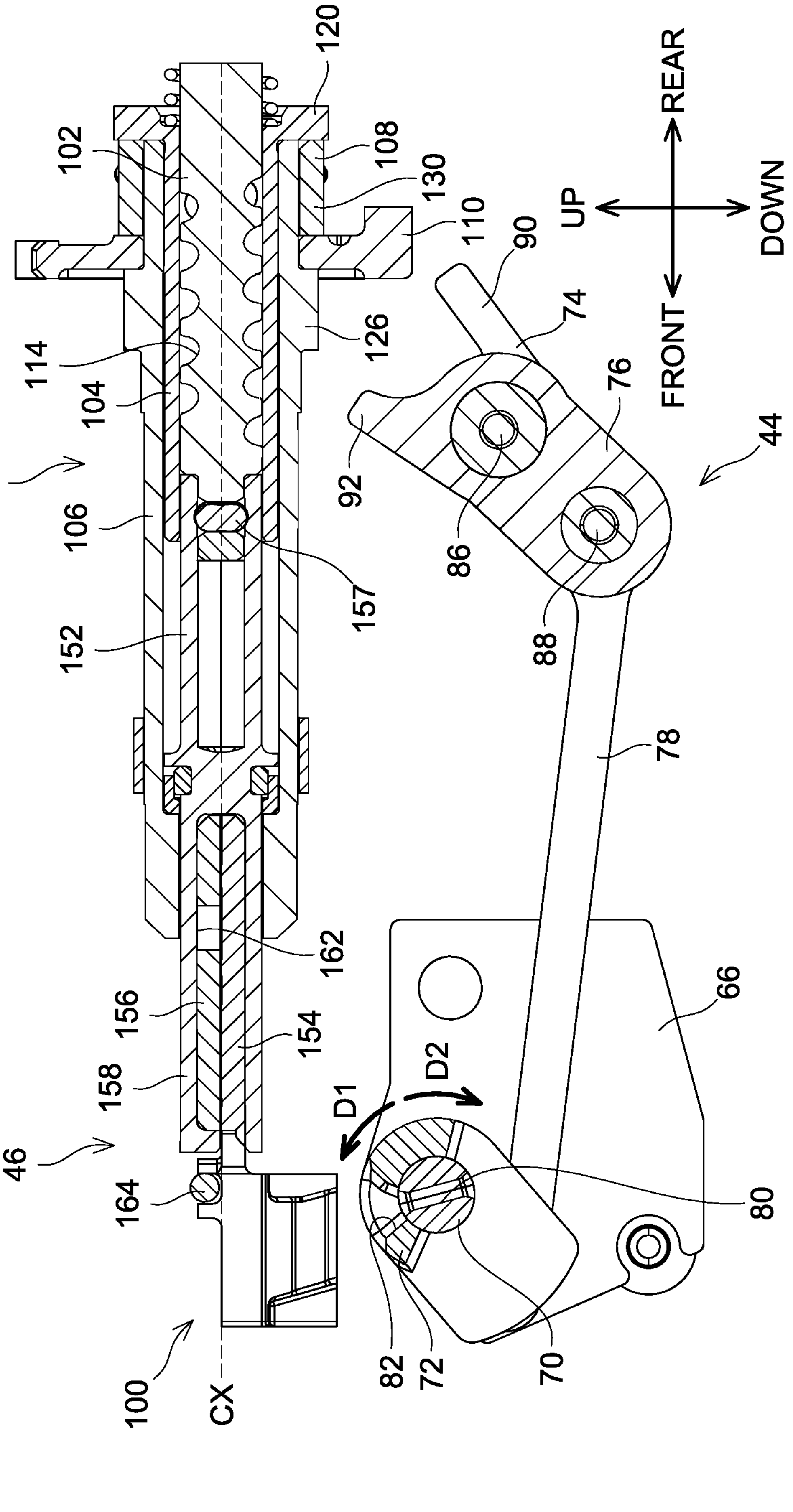
FIG. 5 illustrates a cross-sectional view of a cutting unit 44 and a twisting unit 46 according to the first embodiment.

As shown in FIG. 2, the cutting unit 44 is accommodated in the twisting unit accommodating portion 14. As shown in FIG. 5, the cutting unit 44 comprises a base member 66, a guiding member 68 (see FIG. 4), the first cutter 70, the second cutter 72, a first lever member 74, a second lever member 76, and a link member 78.

The guiding member 68 shown in FIG. 4 is fixed to the base member 66. The guiding member 68 has a guiding hole 68*a*. Each of a width in the front-rear direction and a width in the left-right direction of the guiding hole 68*a* gradually decreases upward from below and then becomes constant. The wire W fed by the feeding unit 40 (see FIG. 2) passes through the guiding hole 68*a*.

As shown in FIG. 5, the first cutter 70 is fixed to the base member 66. The first cutter 70 has a first cutting opening 80. The first cutter 70 is inserted inside the second cutter 72. The second cutter 72 is supported by the first cutter 70 pivotably around the first cutter 70. The second cutter 72 has a second cutting opening 82.

As shown in FIG. 4, the guiding hole 68*a*, the first cutting opening 80, and the second cutting opening 82 are arranged on a path in which the wire W is directed from the feeding unit 40 to the upper curl guide 56. Before the cutting unit 44 cuts the wire W, the first cutting opening 80 and the second cutting opening 82 are connected to each other. When the wire W is fed from the feeding unit 40 by being directed toward the upper curl guide 56, the wire W is guided into the guiding hole 68*a* and passes through the first cutting opening 80 and the second cutting opening 82. When the second cutter 72 pivots in a first direction D1 relative to the first cutter 70 with the wire W through the first cutting opening 80 and the second cutting opening 82, the first cutter 70 and the second cutter 72 make contact with the wire W, thereby cutting the wire W.

As shown in FIG. 5, the first lever member 74 and the second lever member 76 are fixed to each other via a first shaft 86 and a second shaft 88. The first lever member 74 and the second lever member 76 are configured to pivot around the first shaft 86. The first shaft 86 is fixed to the left-side housing 8 (see FIG. 1). The second shaft 88 is not fixed to the left-side housing 8. When the first lever member 74 and the second lever member 76 pivot around the first shaft 86, the second shaft 88 moves along with the first lever member 74 and the second lever member 76. The first lever member 74 comprises a first protrusion 90 configured to be operated by the twisting unit 46. The first protrusion 90 is arranged at an upper end of the first lever member 74. The second lever member 76 comprises a second protrusion 92 configured to be operated by the twisting unit 46. The second protrusion 92 is arranged at an upper end of the second lever member 76. The second protrusion 92 is disposed on a front side relative to the first protrusion 90.

Figure 6:
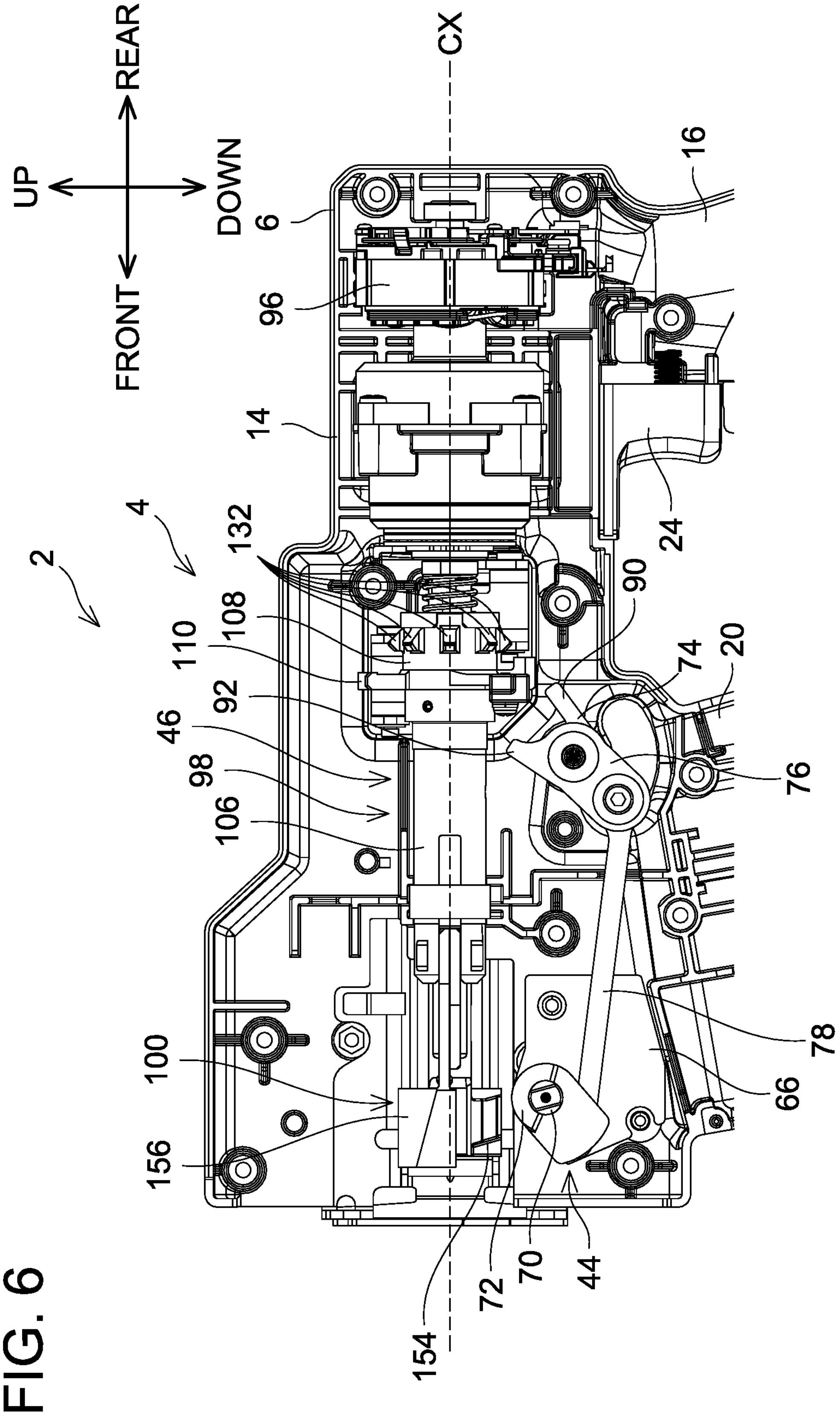
FIG. 6 illustrates a left-side view of the rebar tying tool 2 according to the first embodiment with the left-side housing 8 removed, seeing a twisting unit accommodating portion 14 and its proximity.

A rear end of the link member 78 is attached to the second shaft 88. A front end of the link member 78 is attached to the second cutter 72. The link member 78 connects the second shaft 88 and the second cutter 72. The link member 78 has an elongated shape. As shown in FIG. 6, the link member 78 overlaps with the trigger 24 in the front-rear direction when the rebar tying tool 2 is seen from rear to front. The link member 78 is aligned with the trigger 24 in the front-rear direction when the rebar tying tool 2 is seen from left to right. The link member 78 is disposed in proximity to an upper end of the grip portion 16 in the up-down direction. An upper end of the trigger 24 is disposed higher than a lower end of the link member 78.

Figure 7:
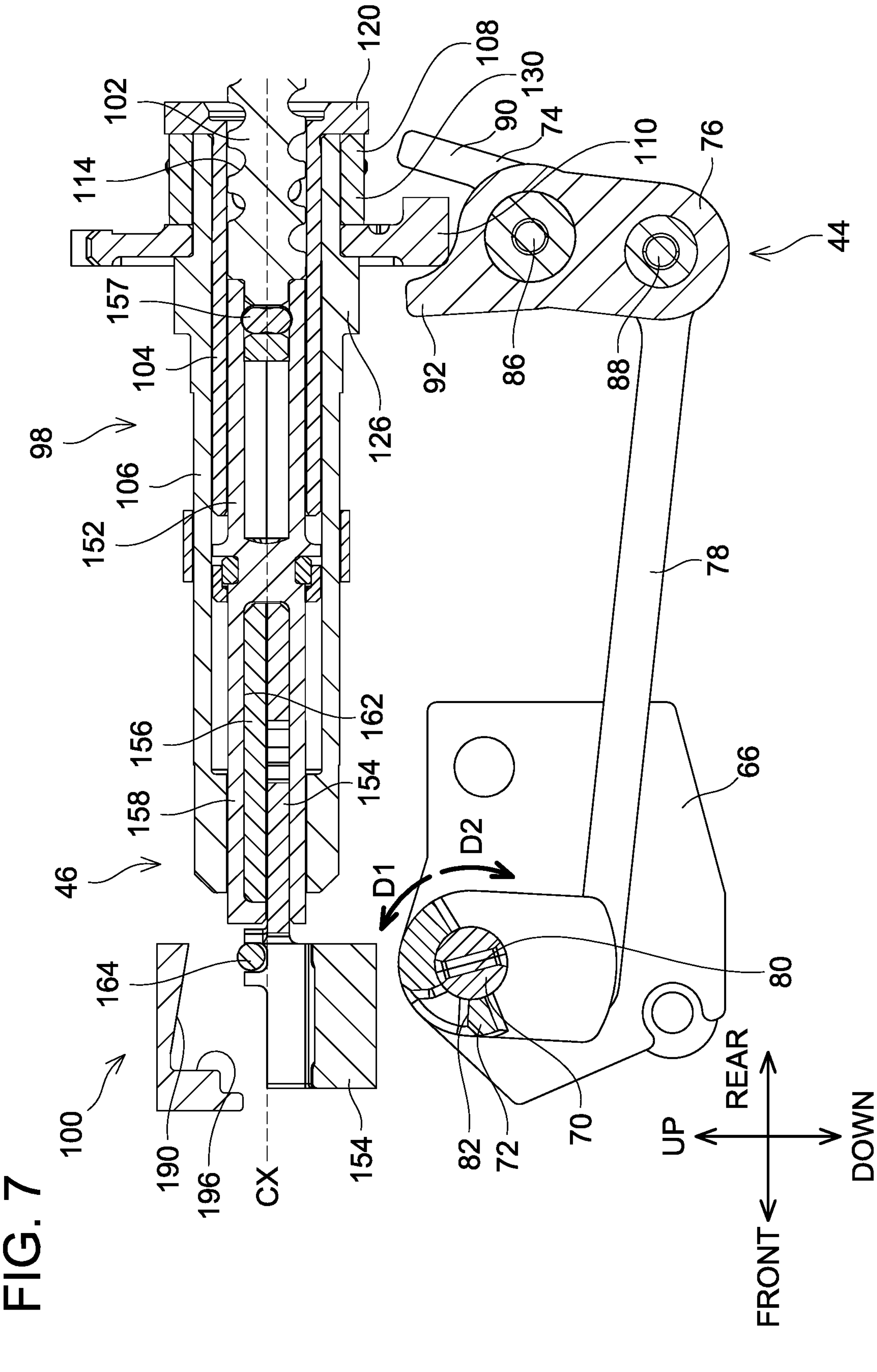
FIG. 7 illustrates a cross-sectional view of the cutting unit 44 and the twisting unit 46 according to the first embodiment.

As shown in FIG. 5, before the cutting unit 44 cuts the wire W, the second shaft 88 is disposed on the front side relative to the first shaft 86. As shown in FIG. 7, when the second protrusion 92 is shifted frontward, the second shaft 88 moves rearward and accordingly the link member 78 moves rearward. Due to this, the second cutter 72 pivots in the first direction D1, by which the wire W is sandwiched by the first cutter 70 and the second cutter 72 and cut. Further, when the first protrusion 90 is shifted rearward as shown in FIG. 5 after the wire W is cut, the second shaft 88 moves frontward and accordingly the link member 78 moves frontward. Due to this, the second cutter 72 pivots in a second direction D2 opposite to the first direction D1. As a result of this, the second cutter 72 is restored in its initial state where the first cutting opening 80 and the second cutting opening 82 are connected to each other.

As shown in FIG. 6, the twisting unit 46 is accommodated in the twisting unit accommodating portion 14. The twisting unit 46 comprises a twisting motor 96, a sleeve unit 98, and a grasping unit 100. The twisting motor 96 is disposed above the grip portion 16. The twisting motor 96 is for example a brushless motor. The twisting motor 96 rotates by power supplied from the battery pack BP. Rotation of the twisting motor 96 is translated to the sleeve unit 98.

Figure 8:
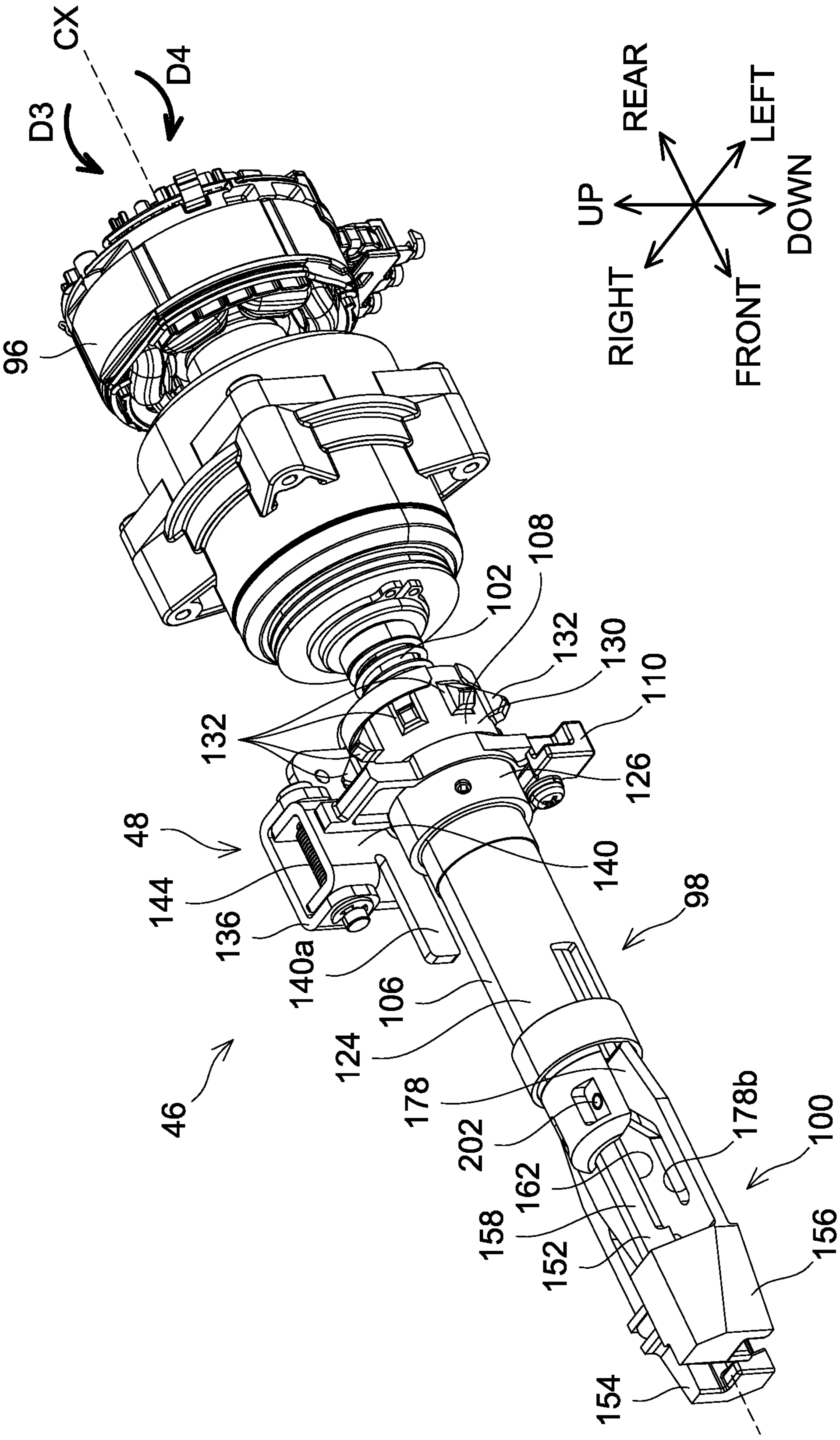
FIG. 8 illustrates a perspective view of the twisting unit 46 according to the first embodiment.

As shown in FIG. 8, the sleeve unit 98 comprises a screw shaft 102, an inner sleeve 104 (see FIG. 9), an outer sleeve 106, a fin member 108, and a push member 110.

Figure 9:
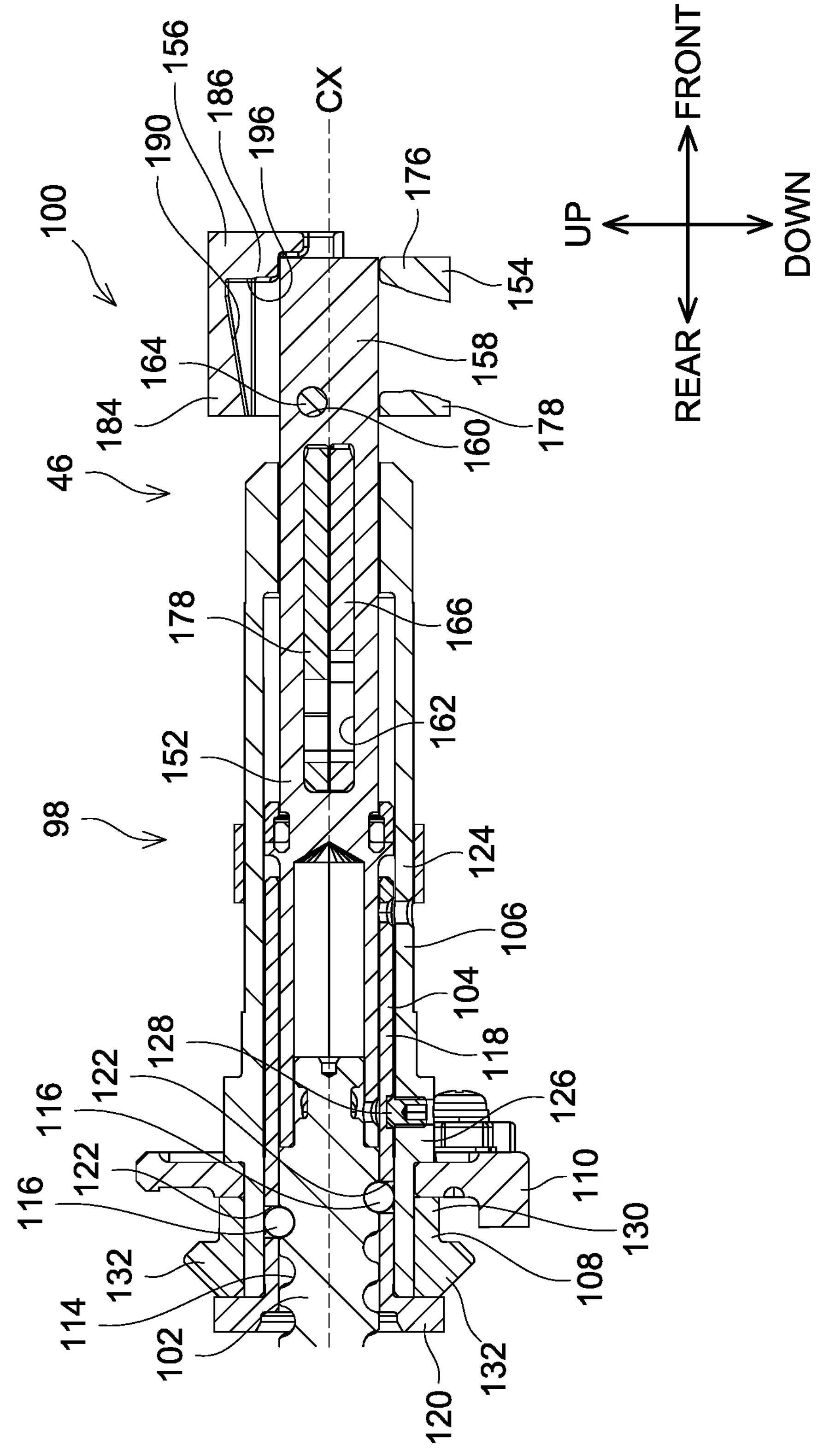
FIG. 9 illustrates a cross-sectional view of the twisting unit 46 according to the first embodiment.

As shown in FIG. 9, the screw shaft 102 extends along a central axis CX extending in the front-rear direction. The screw shaft 102 rotates about the central axis CX along with rotation of the twisting motor 96. A ball recess 114 is defined on an outer peripheral surface of the screw shaft 102. The ball recess 114 extends in a spiral in the front-rear direction. A ball 116 is held movably in the ball recess 114.

The inner sleeve 104 comprises a cylindrical portion 118 and a flange portion 120. The cylindrical portion 118 extends along the central axis CX. The cylindrical portion 118 has the screw shaft 102 inserted therethrough. The cylindrical portion 118 has a ball holding hole 122 penetrating the cylindrical portion 118 in its thickness direction. The ball holding hole 122 is configured to hold the ball 116 rotatably in the ball recess 114. The flange portion 120 protrudes outward from a rear end of the cylindrical portion 118 in a radial direction of the cylindrical portion 118.

The outer sleeve 106 comprises a cylindrical portion 124 and a flange portion 126. The cylindrical portion 124 extends along the central axis CX. The cylindrical portion 124 has the cylindrical portion 118 of the inner sleeve 104 inserted therethrough. The cylindrical portion 124 is fixed by a setscrew 128 to the cylindrical portion 118. Due to this, the outer sleeve 106 is configured to move in the front-rear direction and rotate along with the inner sleeve 104. A rear end of the cylindrical portion 124 is in contact with the flange portion 120 from the front side. The cylindrical portion 124 makes contact with the ball 116 so as to suppress the ball 116 from falling off from the ball recess 114 and the ball holding hole 122. The flange portion 126 protrudes outward in the radial direction from an outer peripheral surface of the cylindrical portion 124. The flange portion 126 is disposed on the front side relative to the rear end of the cylindrical portion 124.

The fin member 108 has the outer sleeve 106 inserted therethrough. The fin member 108 is attached to the outer sleeve 106. The fin member 108 comprises a base portion 130 and eight fin portions 132. The base portion 130 has a substantially cylindrical shape. The base portion 130 is in contact with the flange portion 120 of the inner sleeve 104 from the front side. The fin portions 132 protrude outward in the radial direction from an outer peripheral surface of the base portion 130. As shown in FIG. 8, the eight fin portions 132 are arranged around the outer peripheral surface of the base portion 130 at intervals of 45 degrees from each other.

The fin portions 132 are configured to permit and prohibit rotation of the outer sleeve 106 in cooperation with the rotation limiting unit 48 shown in FIG. 10. A configuration of the rotation limiting unit 48 will be described first. As shown in FIG. 10, the rotation limiting unit 48 comprises a base member 136, a lower stopper 138, an upper stopper 140, a lower torsion spring 142, and an upper torsion spring 144. The lower stopper 138 is supported at a lower part of the base member 136 so as to rock via a lower rock shaft 146. The lower stopper 138 comprises a limiting piece 138*a*. The limiting piece 138*a* is positioned at an upper part of the lower stopper 138. The lower torsion spring 142 biases the limiting piece 138*a* in a direction opening outward (i.e., direction in which the limiting piece 138*a* separates away from the base member 136). The upper stopper 140 is supported at an upper part of the base member 136 so as to rock via an upper rocking shaft 148. The upper stopper 140 comprises a limiting piece 140*a*. The limiting piece 140*a* is positioned at a lower part of the upper stopper 140. A front end of the limiting piece 140*a* is disposed on the front side than a front end of the limiting piece 138*a* is. Also, a rear end of the limiting piece 140*a* is disposed on the front side than a rear end of the limiting piece 138*a* is. The upper torsion spring 144 biases the limiting piece 140*a* in the direction opening outward (i.e., direction in which the limiting piece 140*a* separates away from the base member 136).

As to the lower stopper 138, when the screw shaft 102 rotates about the central axis CX in a clockwise direction D3 (see FIG. 8) as seen from the rear side and one of the fin portions 132 makes contact with the limiting piece 138*a* from above, rotation of the outer sleeve 106 is prohibited. At this occasion, the inner sleeve 104, the outer sleeve 106, and the fin member 108 move frontward, by the ball 116 (see FIG. 9) moving inside the ball recess 114 (see FIG. 9) along with the rotation of the screw shaft 102. Contrary to this, when the screw shaft 102 rotates about the central axis CX in a counterclockwise direction D4 (see FIG. 8) as seen from the rear side, even after one of the fin portions 132 contacts the limiting piece 138*a*, the fin portions 132 that make contact with the limiting piece 138*a* push the limiting piece 138*a* inward. At this occasion, the rotation of the outer sleeve 106 is not prohibited, and the inner sleeve 104, the outer sleeve 106, and the fin member 108 rotate about the central axis CX in the counterclockwise direction D4 along with the screw shaft 102. The fin portion 132 that is in contact with the limiting piece 138*a* pushes the limiting piece 138*a* inward even after the fin portion 132 contacts the limiting piece 138*a*.

As to the upper stopper 140, when the screw shaft 102 rotates about the central axis CX in the clockwise direction D3 (see FIG. 8) as seen from the rear side, even after one of the fin portions 132 contacts the limiting piece 140*a*, the fin portions 132 that make contact with the limiting piece 140*a* push the limiting piece 140*a* inward. At this occasion, the rotation of the outer sleeve 106 is not prohibited, as a result of which the inner sleeve 104, the outer sleeve 106, and the fin member 108 rotate about the central axis CX in the clockwise direction D3 along with the screw shaft 102. Contrary to this, when the screw shaft 102 rotates about the central axis CX in the counterclockwise direction D4 (see FIG. 8) as seen from the rear side and one of the fin portions 132 makes contact with the limiting piece 140*a* from below, the rotation of the outer sleeve 106 is prohibited. At this occasion, the inner sleeve 104, the outer sleeve 106, and the fin member 108 move rearward, by the ball 116 (see FIG. 9) moving inside the ball recess 114 (see FIG. 9) along with the rotation of the screw shaft 102.

Back to FIG. 9, the push member 110 will be described. The push member 110 has a substantially plate shape. The push member 110 has the cylindrical portion 124 of the outer sleeve 106 inserted therethrough. The push member 110 is attached to the cylindrical portion 124. The push member 110 is pivotable around the outer peripheral surface of the cylindrical portion 124. The push member 110 is interposed between a rear end of the flange portion 126 and a front end of the base portion 130 of the fin member 108. The push member 110 is disposed on the front side than (that is, closer to the rebars R) the fin member 108 is. The push member 110 is configured to move along with the outer sleeve 106 in the front-rear direction. Also, rotation of the push member 110 relative to the right-side housing 6 (see FIG. 1) and the left-side housing 8 (see FIG. 1) is restricted. The push member 110 does not rotate about the central axis CX along with the rotation of the outer sleeve 106.

As shown in FIG. 7, when the push member 110 moves frontward with the outer sleeve 106, the push member 110 makes contact with the second protrusion 92 of the second lever member 76 and thus pushes the second protrusion 92 frontward. Due to this, the second cutter 72 rotates in the first direction D1. Further when the push member 110 moves rearward along with the outer sleeve 106 as shown in FIG. 5, the push member 110 makes contact with the first protrusion 90 of the first lever member 74 and thus pushes the first protrusion 90 rearward. Due to this, the second cutter 72 rotates in the second direction D2.

Figure 11:
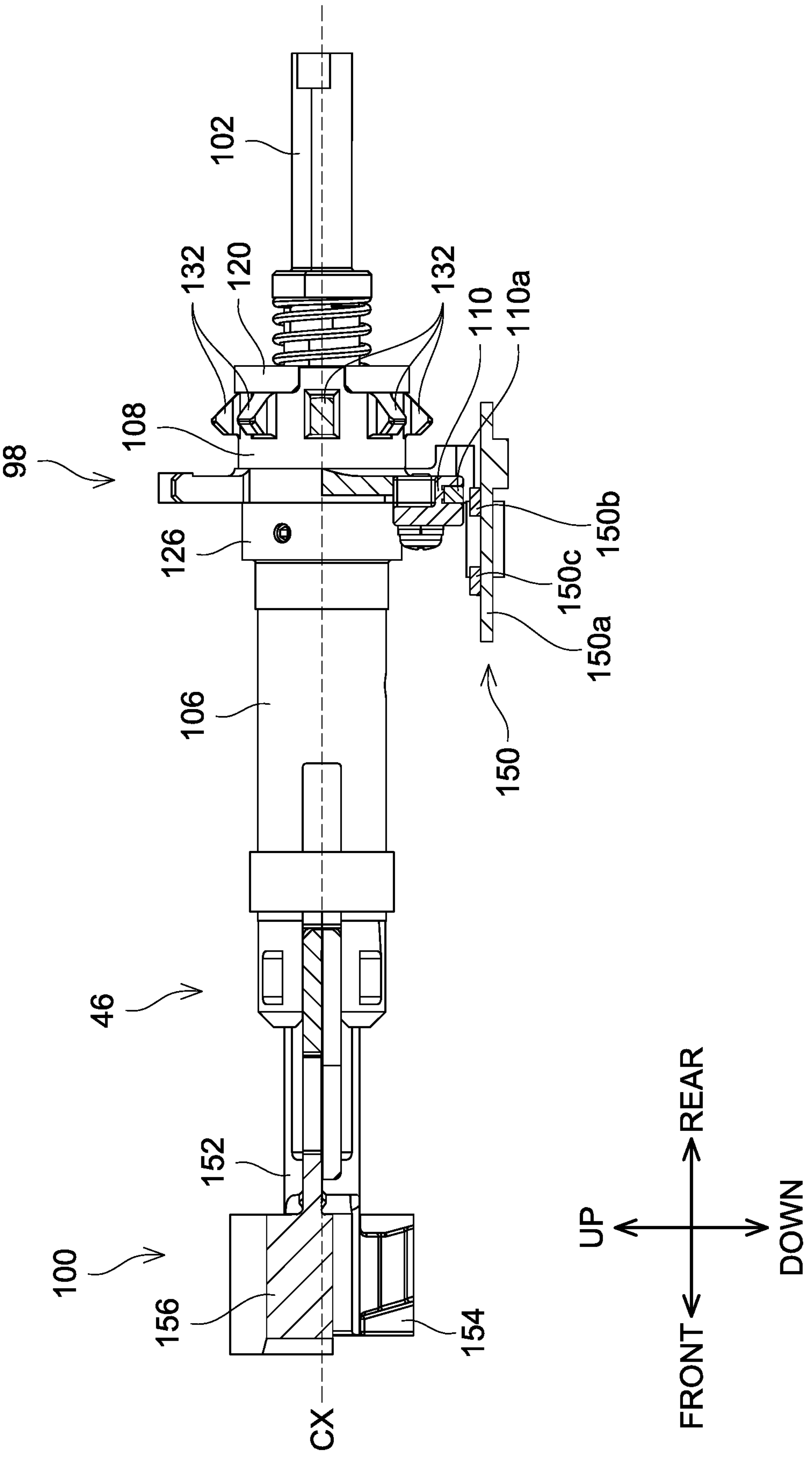
FIG. 11 illustrates a cross-sectional view of the twisting unit 46 and a sensor unit 150 according to the first embodiment.

As shown in FIG. 11, the push member 110 comprises a permanent magnet **110*a*. The permanent magnet 110*a* is located at a lower end of the push member 110. Also, the sensor unit 150 is arranged at a position facing the permanent magnet 110*a* in the up-down direction. The sensor unit 150 comprises a sensor board 150*a* and two magnetic sensors 150*b*, 150*c*. The magnetic sensors 150*b*, 150*c* are fixed on the sensor board 150*a*. The magnetic sensor 150*b* is arranged at a position facing the permanent magnet 110*a* when the grasping unit 100 is in an initial state. The magnetic sensor 150*c* is disposed on the front side relative to the magnetic sensor 150*b*. The magnetic sensor 150*c* is disposed at a position which faces the permanent magnet 110*a* when the wire W is clamped between the left-side clamping member 156 to be described later and a clamp shaft 152. The magnetic sensors 150*b*, 150*c* are configured to detect magnetism from the permanent magnet 110*a* when the magnetic sensors 150*b*, 150*c* face the permanent magnet 110*a*. Due to this, the sensor unit 150 is configured to detect the position of the push member 110 in the front-rear direction (i.e., position of the outer sleeve 106** in the front-rear direction).

Figure 12:
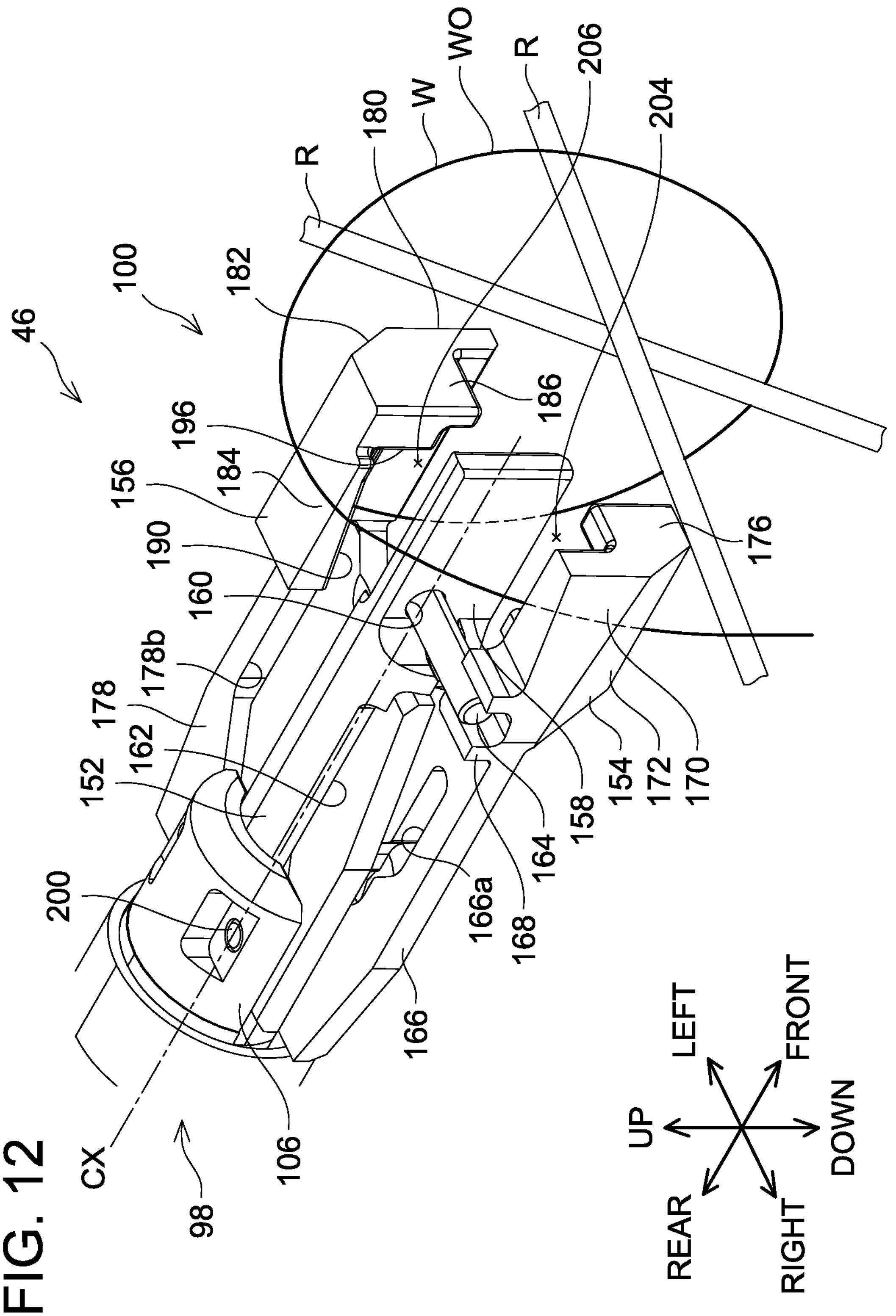
FIG. 12 illustrates a perspective view of the twisting unit 46 according to the first embodiment, seeing a grasping unit 100 and its proximity.

As shown in FIG. 12, the grasping unit 100 protrudes frontward (toward the rebars R) from a front part of the sleeve unit 98. The grasping unit 100 extends along the central axis CX. The grasping unit 100 comprises the clamp shaft 152, the right-side clamping member 154, and the left-side clamping member 156.

As shown in FIG. 9, the clamp shaft 152 is inserted into the inner sleeve 104 and the outer sleeve 106 from the front side. The clamp shaft 152 is disposed on the central axis CX. A rear end of the clamp shaft 152 is attached to a front end of the screw shaft 102 via an attaching piece 157 (see FIG. 7). The attaching piece 157 makes it impossible for the clamp shaft 152 to move in the front-rear direction relative to the screw shaft 102. The clamp shaft 152 is configured to rotate about the screw shaft 102.

As shown in FIG. 12, the clamp shaft 152 comprises a flat plate portion 158, an engaging hole 160, and an opening 162. The flat plate portion 158 is positioned at a front part of the clamp shaft 152. The flat plate portion 158 has a shape of substantially flat plate along the up-down direction and the front-rear direction. The engaging hole 160 penetrates the flat plate portion 158 in a thickness direction (the left-right direction in FIG. 12). The engaging hole 160 engages with a pin 164. The opening 162 is disposed on the rear side relative to the flat plate portion 158. The opening 162 penetrates the clamp shaft 152 in the left-right direction and extends in the front-rear direction.

The right-side clamping member 154 is attached to the clamp shaft 152 by extending through the opening 162 of the clamp shaft 152 from right to left. The left-side clamping member 156 is attached to the clamp shaft 152 by extending through the opening 162 from left to right.

Figure 13:
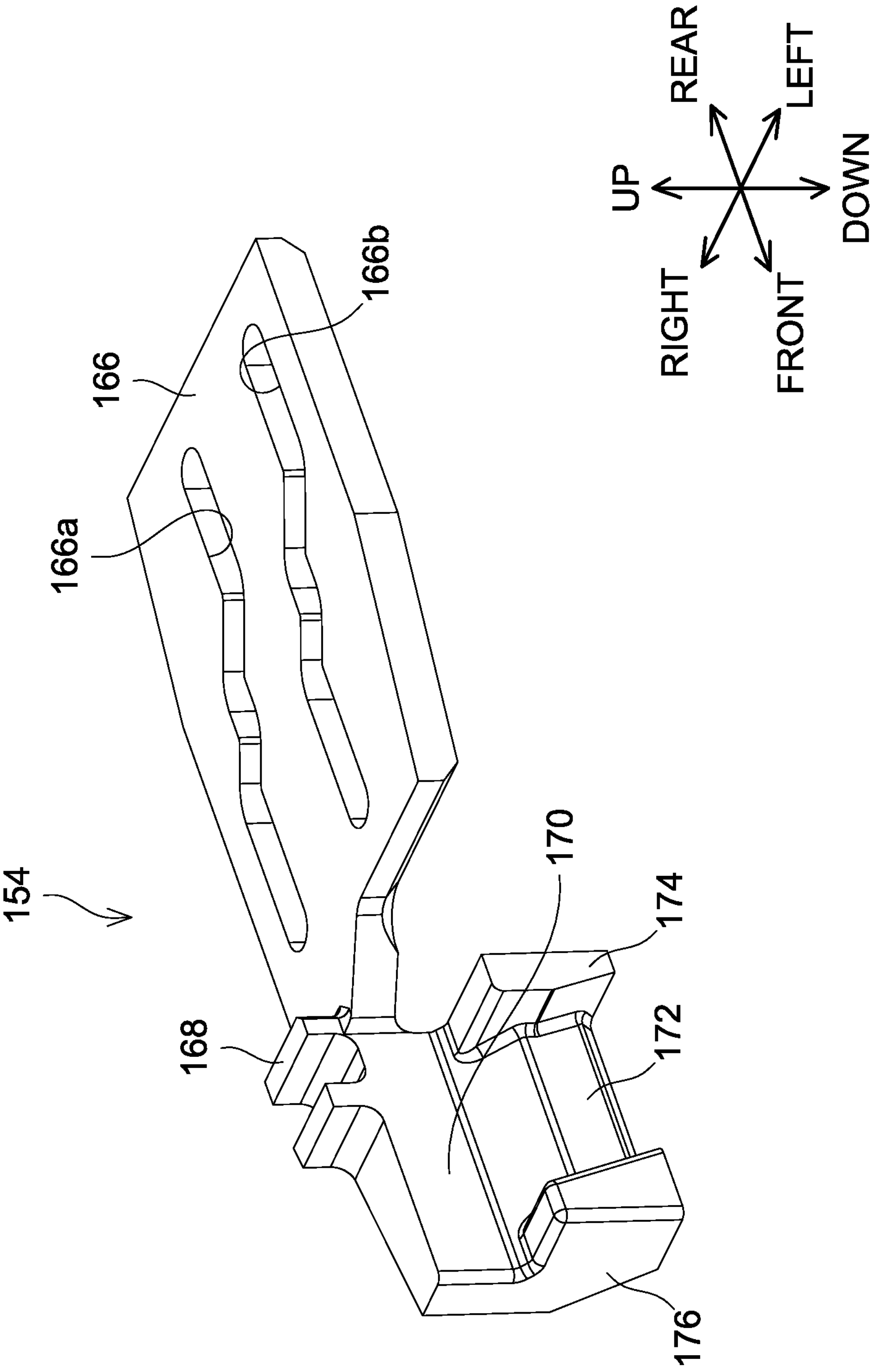
FIG. 13 illustrates a perspective view of a right-side clamping member 154 according to the first embodiment.

As shown in FIG. 13, the right-side clamping member 154 comprises a base portion 166, a pin holding portion 168, a lower-side protruding portion 170, a contact portion 172, a rear-side guard portion 174, and a front-side guard portion 176. The base portion 166 has a shape of substantially flat plate extending along the front-rear direction and the left-right direction. The base portion 166 has cam holes **166*a*, 166*b* defined therein. Each of the cam holes 166*a*, 166*b* extends frontward from its rear end and then curves to extend right-frontward, further curves to extend frontward and then curves to extend right-frontward, and further curves to extend frontward. The pin holding portion 168 is arranged in proximity to a right-front-end of the base portion 166. The pin holding portion 168 is arranged at an upper surface of the base portion 166. The pin holding portion 168 slidably holds the pin 164 (see FIG. 12). The lower-side protruding portion 170 protrudes downward from the right-front end of the base portion 166. The contact portion 172 protrudes left-downward from a lower end of the lower-side protruding portion 170. The rear-side guard portion 174 protrudes leftward from a rear end of the contact portion 172. The front-side guard portion 176 protrudes leftward from a front end of the contact portion 172**.

Figure 14:
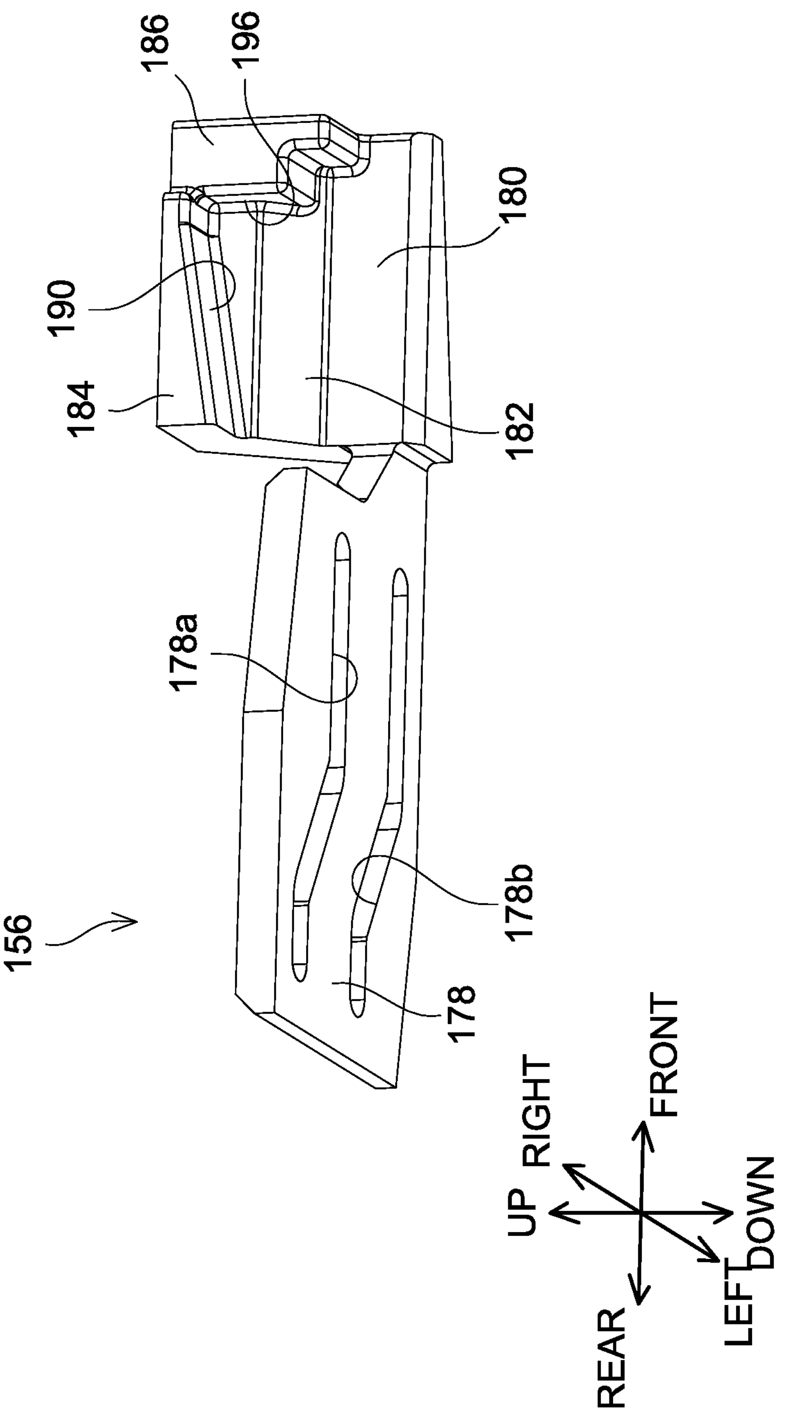
FIG. 14 illustrates a perspective view of a left-side clamping member 156 according to the first embodiment.

As shown in FIG. 14, the left-side clamping member 156 comprises a base portion 178, an upper-side protruding portion 180, a contact portion 182, an upper-side guard portion 184, and a front guard portion 186. The base portion 178 has a shape of substantially flat plate extending along the front-rear direction and the left-right direction. The base portion 178 has cam holes **178*a*, 178*b* defined therein. Each of the cam holes 178*a*, 178*b* extends frontward from its rear end, curves to extend left-frontward, and further curves to extend frontward. The upper-side protruding portion 180 protrudes upward from a left-front end of the base portion 178. The contact portion 182 protrudes right-upward from an upper end of the upper-side protruding portion 180. The upper-side guard portion 184 protrudes rightward from an upper end of the contact portion 182. The front guard portion 186 protrudes rightward both from a front end of the upper-side protruding portion 180 and a front end of the contact portion 182. The front guard portion 186 is connected to a front end of the upper-side guard portion 184**.

Figure 15:
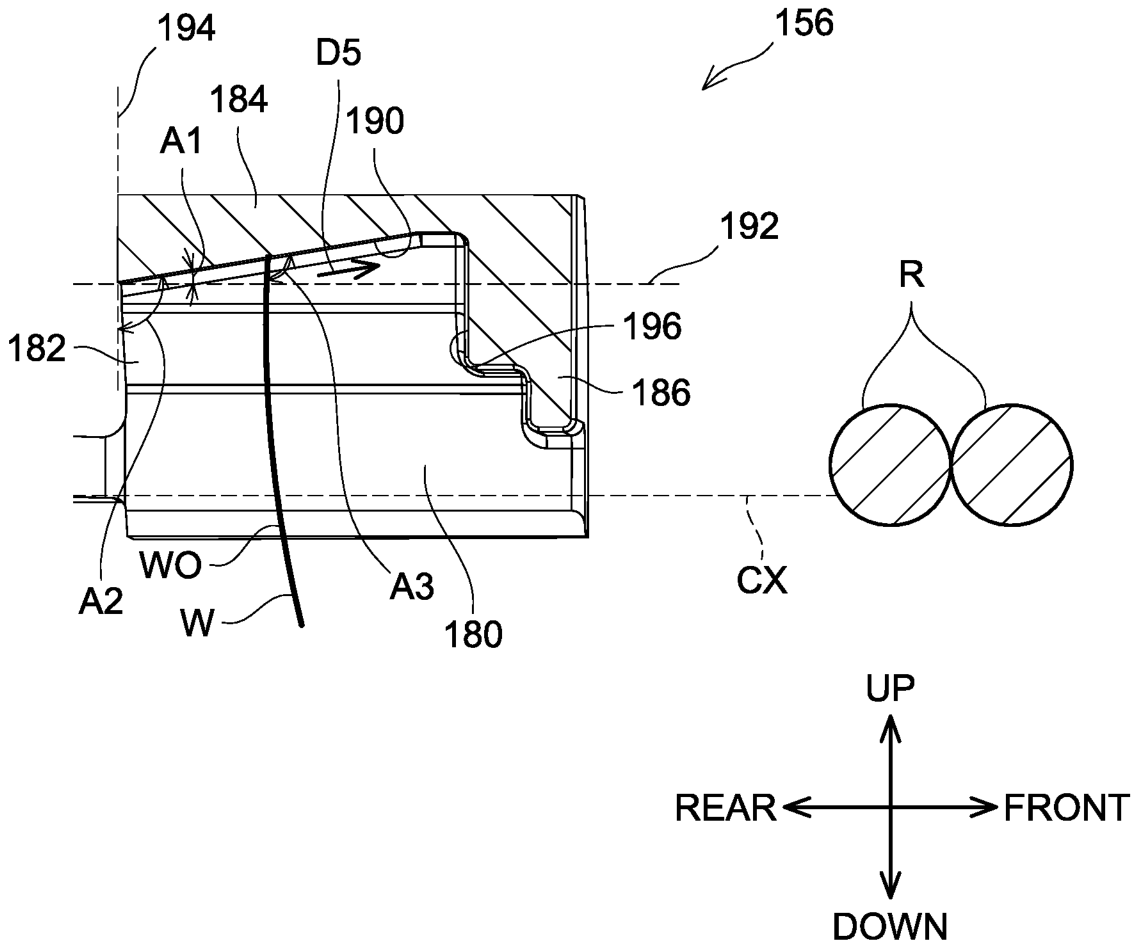
FIG. 15 illustrates a cross-sectional view of the left-side clamping member 156 according to the first embodiment, seeing a wire tip guiding surface 190 and its proximity.

As shown in FIG. 15, the upper-side guard portion 184 comprises the wire tip guiding surface 190. The wire tip guiding surface 190 corresponds to a lower surface of the upper-side guard portion 184. The wire tip guiding surface 190 has a flat shape. The wire tip guiding surface 190 extends front-upward from its rear end. The wire tip guiding surface 190 is inclined relative to the central axis CX such that the wire tip guiding surface 190 separates farther away from the central axis CX from a rear end to a front end of the wire tip guiding surface 190. That is, a distance between the wire tip guiding surface 190 and the central axis CX is smallest at the rear end of the wire tip guiding surface 190, increases from the rear end to the front end of the wire tip guiding surface 190, and is greatest at the front end of the wire tip guiding surface 190.

The wire tip guiding surface 190 is inclined relative to a first virtual surface 192 extending along the front-rear direction and the left-right direction. An inclination angle A1 of the wire tip guiding surface 190 relative to the first virtual surface 192 is greater than zero degrees. The inclination angle A1 is an angle between the wire tip guiding surface 190 and the first virtual surface 192 and measured clockwise from the wire tip guiding surface 190 when the rebar tying tool 2 is seen leftward from the right. Further, the inclination angle A1 may be 5 degrees or more. In the present embodiment, the inclination angle A1 is 10 degrees. The wire tip guiding surface 190 is inclined relative to a second virtual surface 194 extending along the left-right direction and the up-down direction. An inclination angle A2 of the wire tip guiding surface 190 relative to the second virtual surface 194 is greater than 90 degrees. The inclination angle A2 is an angle between the wire tip guiding surface 190 and the second virtual surface 194 and measured clockwise from the wire tip guiding surface 190 when the rebar tying tool 2 is seen leftward from the right side. Further, the inclination angle A2 may be 95 degrees or more. In the present embodiment, the inclination angle A2 is 100 degrees.

The wire tip guiding surface 190 is disposed on a wrapping track WO at a tip of the wire W while the wire W is being guided around the rebars R by the guiding unit 42 (see FIG. 4). An angle A3 formed by the wire tip guiding surface 190 and the wrapping track WO is greater than 90 degrees. The angle A3 is an angle between the wire tip guiding surface 190 and the wrapping track WO and measured clockwise from the wire tip guiding surface 190 when the rebar tying tool 2 is seen leftward from the right side. Also, the angle A3 may be 95 degrees or more. In the present embodiment, the angle A3 is 100 degrees. The angle A3 is substantially equal to the inclination angle A2.

The front guard portion 186 comprises a guarding surface 196. The guarding surface 196 corresponds to a rear surface of the front guard portion 186. The guarding surface 196 is disposed on the front side relative to the wire tip guiding surface 190 (closer toward the rebars R). The guarding surface 196 is disposed between the wire tip guiding surface 190 and the rebars R in the front-rear direction. The guarding surface 196 has a flat shape. The guarding surface 196 overlaps the wire tip guiding surface 190 when the left-side clamping member 156 is seen rearward from the front side. The guarding surface 196 is substantially parallel to the second virtual surface 194 and is substantially perpendicular to the first virtual surface 192.

As shown in FIG. 12, the base portion 166 of the right-side clamping member 154 and the base portion 178 of the left-side clamping member 156 are inserted into the opening 162 of the clamp shaft 152. In such state, an engaging pin 200 is disposed in the cam hole 166*a* and the cam hole 178*a* (see FIG. 14). As shown in FIG. 8, the engaging pin 202 is disposed in the cam hole 166*b* (see FIG. 13) and the cam hole 178*b*. The engaging pins 200, 202 are held by the outer sleeve 106. When the outer sleeve 106 moves relative to the clamp shaft 152 in the front-rear direction, the engaging pin 200 moves in the cam hole 166*a* and the cam hole 178*a* in the front-rear direction, and the engaging pin 202 moves in the cam hole 166*b* and the cam hole 178*b* in the front-rear direction.

As shown in FIG. 12, in the initial state where the clamp shaft 152 protrudes frontward from the outer sleeve 106, the right-side clamping member 154 is located on the right side from the clamp shaft 152 at a greatest degree. In this state, a right-side wire passage 204 in which the wire W is configured to pass is defined between the lower-side protruding portion 170 of the right-side clamping member 154 and the flat plate portion 158 of the clamp shaft 152. When the outer sleeve 106 moves frontward from the clamp shaft 152, the right-side clamping member 154 moves leftward relative to the clamp shaft 152, then the leftward motion stops temporarily, and then moves leftward again. Due to this, the wire W is clamped between the contact portion 172 of the right-side clamping member 154 and the flat plate portion 158, and a front end of the right-side wire passage 204 is covered by the front-side guard portion 176.

Also, in the initial state where the clamp shaft 152 protrudes frontward from the outer sleeve 106, the left-side clamping member 156 is disposed on the left side from the clamp shaft 152 at a greatest degree. In this state, a left-side wire passage 206 in which the wire W is configured to pass is defined between the upper-side protruding portion 180 of the left-side clamping member 156 and the flat plate portion 158 of the clamp shaft 152. When the outer sleeve 106 moves frontward from the clamp shaft 152 from this state, the left-side clamping member 156 moves rightward from the clamp shaft 152. Due to this, the wire W is clamped between the contact portion 182 of the left-side clamping member 156 and the flat plate portion 158, and a front end of the left-side wire passage 206 is covered by the front guard portion 186.

How the tip of the wire W fed by the feeding unit 40 is wrapped around the rebars R will be described. As shown in FIG. 4, the tip of the wire W fed by the feeding unit 40 (see FIG. 2) is firstly guided into the guiding hole 68*a* to pass through the first cutting opening 80 and the second cutting opening 82. Next, the tip of the wire W passes through the right-side wire passage 204 and is guided by the upper curl guide 56 to pass through the upper wire passage 60. Thereafter, the tip of the wire W passes through the lower wire passage 62 and moves rear-upward. Next, as shown in FIG. 12, the tip of the wire W passes through the left-side wire passage 206 and makes contact with the wire tip guiding surface 190.

When the tip of the wire W makes contact with the wire tip guiding surface 190 as shown in FIG. 15, the tip of the wire W moves on the wire tip guiding surface 190 by being guided by the wire tip guiding surface 190. Here, the tip of the wire W moves on the wire tip guiding surface 190 from front to rear in a first comparative example where the wire tip guiding surface 190 is not inclined relative to the central axis CX and in a second comparative example where the wire tip guiding surface 190 is inclined such that the wire tip guiding surface 190 separates farther away from the central axis CX as it extends from front to rear. At this occasion, the tip of the wire W moves in a direction separating away from the rebars R. On the other hand, in the present embodiment, the tip of the wire W moves in a moving direction D5 from rear to front. At this occasion, the tip of the wire W moves in a direction approaching the rebars R. After the tip pf the wire W has moved on the wire tip guiding surface 190, the tip of the wire W makes contact with the guarding surface 196. Due to this, the tip of the wire W can be suppressed from escaping from between the left-side clamping member 156 and the clamp shaft 152. Thereafter, the feeding of the wire W by the feeding unit 40 (see FIG. 2) stops. Due to this, the wire W is wrapped around the rebars R. Also, the tip of the wire W is positioned on the guarding surface 196. Further, a distance between the tip of the wire W and the rebars R in the present embodiment is shorter than a distance between the tip of the wire W and the rebars R in the first comparative example and the second comparative example.

Next, a motion from gripping the wire W until twisting the same will be described. After the wire W has been wrapped around the rebars R, the outer sleeve 106 shown in FIG. 11 moves frontward relative to the clamp shaft 152 along with rotation of the screw shaft 102 in the clockwise direction D3 (see FIG. 3). Due to this, the left-side clamping member 156 moves rightward relative to the clamp shaft 152 and thereby the tip of the wire W is clamped between the left-side clamping member 156 and the clamp shaft 152. Also, the right-side clamping member 154 moves leftward relative to the clamp shaft 152. At this occasion, the wire W is not clamped between the right-side clamping member 154 and the clamp shaft 152. Next, the feeding unit 40 shown in FIG. 2 pulls the wire W back toward the bobbin 32, by which the wire W around the rebars R shrinks in diameter and makes contact with the rebars R. Thereafter, the outer sleeve 106 shown in FIG. 7 further moves frontward relative to the clamp shaft 152 along with the rotation of the screw shaft 102. At this occasion, the push member 110 pushes the second protrusion 92 of the second lever member 76 frontward. Due to this, the wire W is cut by the first cutter 70 and the second cutter 72 in proximity to a boundary between the first cutting opening 80 and the second cutting opening 82. Next, the outer sleeve 106 shown in FIG. 8 further moves frontward relative to the clamp shaft 152 along with the rotation of the screw shaft 102. Due to this, the right-side clamping member 154 further moves leftward relative to the clamp shaft 152, and the wire W is clamped between the right-side clamping member 154 and the clamp shaft 152 in proximity to the cutting spot. Next, the outer sleeve 106 further moves frontward relative to the clamp shaft 152 along with the rotation of the screw shaft 102. When the fin portions 132 of the fin member 108 move frontward beyond the front end of the limiting piece 138*a* (see FIG. 10) of the rotation limiting unit 48, the fin portions 132 are no longer in contact with the limiting piece 138*a*. For this reason, the rotation of the outer sleeve 106 is permitted, by which the grasping unit 100 rotates with the outer sleeve 106 around the central axis CX in the clockwise direction D3. Due to this, the wire W is twisted, by which the rebars R are tied with the wire W.

Figure 16:
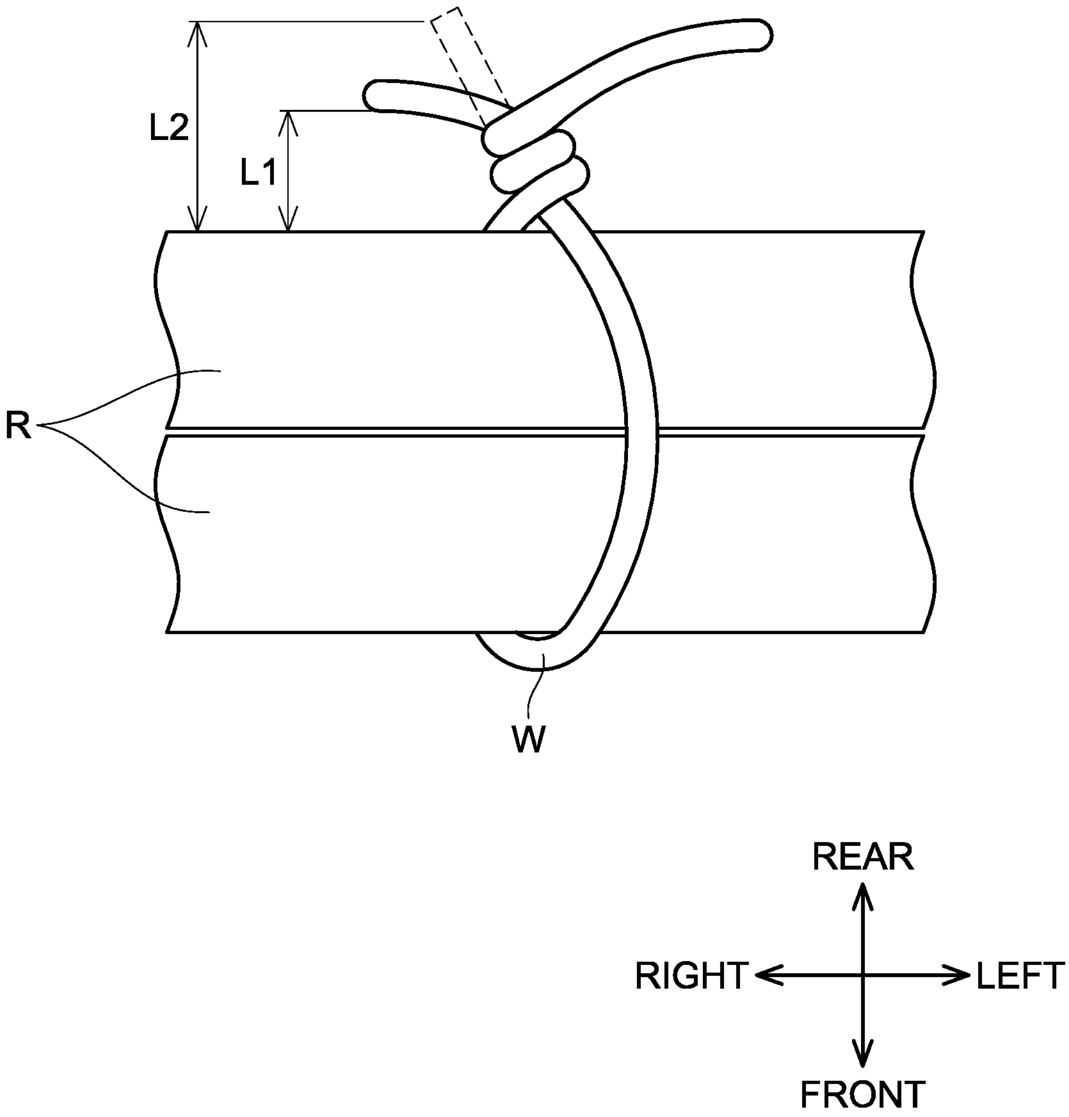
FIG. 16 illustrates a side view of a wire W and rebars R with the wire W twisted in the first embodiment.

As described above, before the wire W is twisted, the distance between the tip of the wire W and the rebars R in the present embodiment is shorter than the distance between the tip of the wire W and the rebars R in the first and second comparative examples. Due to this, as shown in FIG. 16, even after the wire W is twisted, a wire-tip protruding height L1 of the wire W indicating the distance between the tip of the wire W and the rebars R in the present embodiment is shorter than a wire-tip protruding height L2 in the first and second comparative examples.

(Effects)

The rebar tying tool 2 according to the present embodiment is configured to tie the rebars R with the wire W. The rebar tying tool 2 comprises: the screw shaft 102 configured to rotate; the outer sleeve 106 (example of a sleeve) through which the screw shaft 102 is inserted, and configured to move in the front-rear direction and rotate; the fin member 108 attached to the outer sleeve 106 and configured to permit and prohibit rotation of the outer sleeve 106; the push member 110 attached to the outer sleeve 106 and configured to rotate about the outer sleeve 106, wherein the push member 110 does not rotate along with the rotation of the outer sleeve 106; the cutting unit 44 (example of an operated unit) having the longitudinal direction in the front-rear direction and configured to be operated by the push member 110 when the outer sleeve 106 moves in the front-rear direction; and the grasping unit 100 protruding from the front part of the outer sleeve 106, configured to rotate with the outer sleeve 106, and configured to grasp the wire W. The push member 110 is disposed on the front side relative to the fin member 108.

According to the above configuration, since the push member 110 is disposed on the front side relative to the fin member 108, a space required for disposing the cutting unit 44 can be reduced in the front-rear direction, as compared to a configuration where the push member 110 is disposed on the rear side relative to the fin member 108. Due to this, degree of freedom in arrangement of the cutting unit 44 can be improved.

The cutting unit 44 comprises: the first lever member 74 or the second lever member 76 (example of operated member) which the push member 110 is configured to contact and configured to be operated by the push member 110 when the push member 110 is in contact with the first lever member 74 or the second lever member 76; and the second cutter 72 (example of a cutter) configured to cut the wire W and work when the first lever member 74 or the second lever member 76 is operated by the push member 110.

The second cutter 72 needs to be disposed in proximity to the wire W in order to cut the wire W. According to the above configuration, since the push member 110 is disposed on the front side relative to the fin member 108, a distance between the push member 110 and the rebars R can be decreased as compared to a configuration where the push member 110 is disposed on the rear side relative to the fin member 108. Due to this, the cutting unit 44 can be made smaller in the front-rear direction.

The cutting unit 44 further comprises the link member 78 connecting the first lever member 74 or the second lever member 76 and the second cutter 72.

According to the above configuration, the link member 78 can be made smaller in the front-rear direction as compared to the configuration where the push member 110 is disposed on the rear side relative to the fin member 108.

The push member 110 is clamped between the outer sleeve 106 and the fin member 108 in the front-rear direction.

According to the above configuration, the push member 110 can be attached to the outer sleeve 106 with a simple configuration.

The rebar tying tool 2 further comprises the trigger 24 configured to be pushed into by a user. The trigger 24 is aligned with the cutting unit 44 when the rebar tying tool 2 is viewed in the left-right direction perpendicular to the front-rear direction.

According to the above configuration, the rebar tying tool 2 can be suppressed from being large in a direction perpendicular to the front-rear direction as compared to a configuration where the trigger 24 is not aligned with the cutting unit 44 in the front-rear direction when the rebar tying tool 2 is seen along the left-right direction perpendicular to the front-rear direction.

The rebar tying tool 2 is configured to tie the rebars R with the wire W. The rebar tying tool 2 comprises: the screw shaft 102 configured to rotate; the outer sleeve 106 (example of a sleeve) through which the screw shaft 102 is inserted, and configured to move in the front-rear direction and rotate; the fin portion 132 (example of a fin) configured to rotate with the outer sleeve 106; the push member 110 attached to the outer sleeve 106 and configured to rotate about the outer sleeve 106, wherein the push member 110 does not rotate along with the rotation of the outer sleeve 106; the cutting unit 44 (example of an operated unit) having the longitudinal direction in the front-rear direction and configured to be operated by the push member 110 when the outer sleeve 106 moves in the front-rear direction; and the grasping unit 100 protruding from the front part of the outer sleeve 106, configured to rotate with the outer sleeve 106, and configured to grasp the wire W. The push member 110 is disposed on the front side relative to the fin portion 132.

The cutting unit 44 comprises: the first lever member 74 or the second lever member 76 (example of operated member) which the push member 110 is configured to contact and configured to be operated by the push member 110 when the push member 110 is in contact with the first lever member 74 or the second lever member 76; and the second cutter 72 (example of a cutter) configured to cut the wire W and work when the first lever member 74 or the second lever member 76 is operated by the push member 110.

The outer sleeve 106 comprises: a cylindrical portion 124; and a base portion 130 (example of a flange portion). The push member 110 is disposed on the cylindrical portion 124. The movement of the push member 110 relative to the outer sleeve 106 is restricted by the push member 110 contacting the base portion 130.

Second Embodiment

Figure 17:
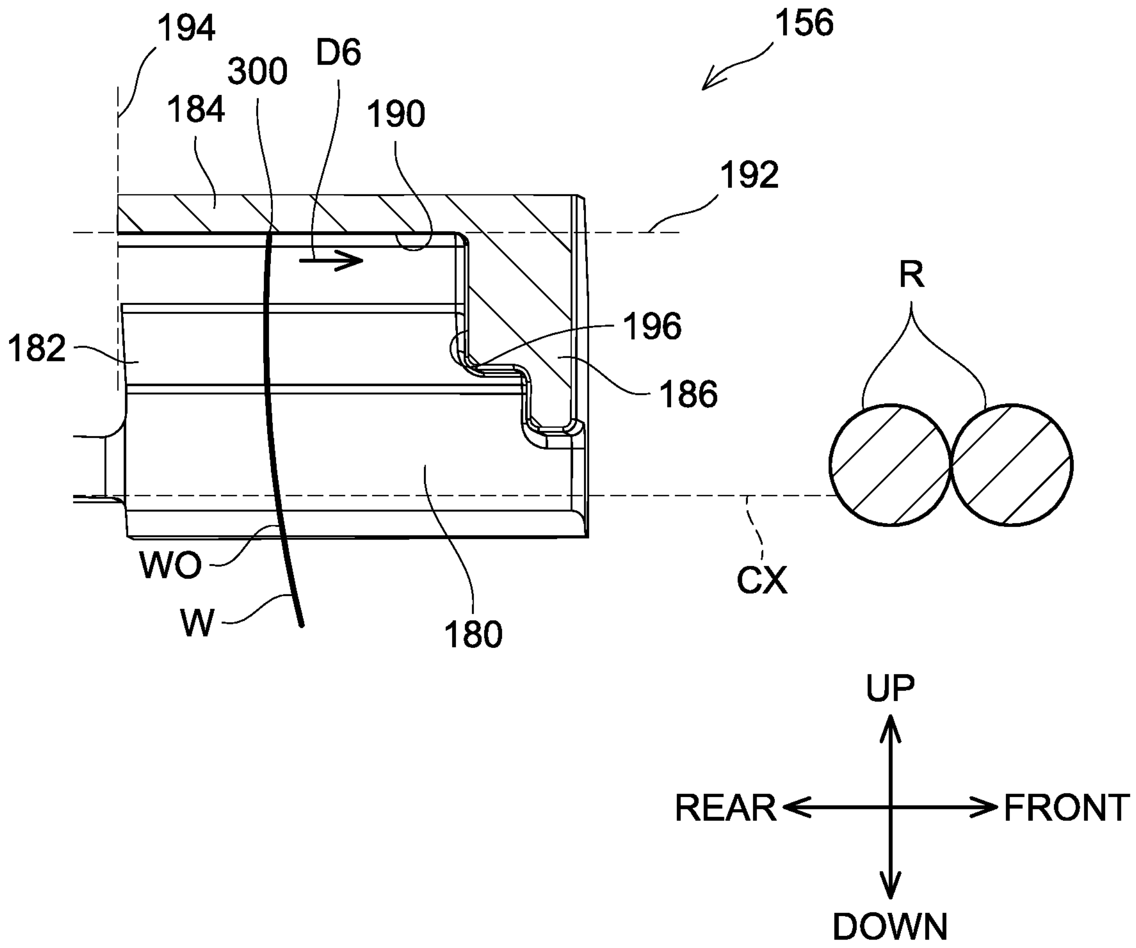
FIG. 17 illustrates a cross-sectional view of a left-side clamping member 156 according to a second embodiment, seeing a wire tip guiding surface 190 and its proximity.

In the second embodiment, only the differences from the first embodiment will be described. As shown in FIG. 17, the wire tip guiding surface 190 is substantially parallel to the first virtual surface 192. A distance between the wire tip guiding surface 190 and the central axis CX is substantially equal between the front end and the rear end of the wire tip guiding surface 190. The wire tip guiding surface 190 is substantially perpendicular to the second virtual surface 194. The wire tip guiding surface 190 is substantially perpendicular to the guarding surface 196.

Figure 18:
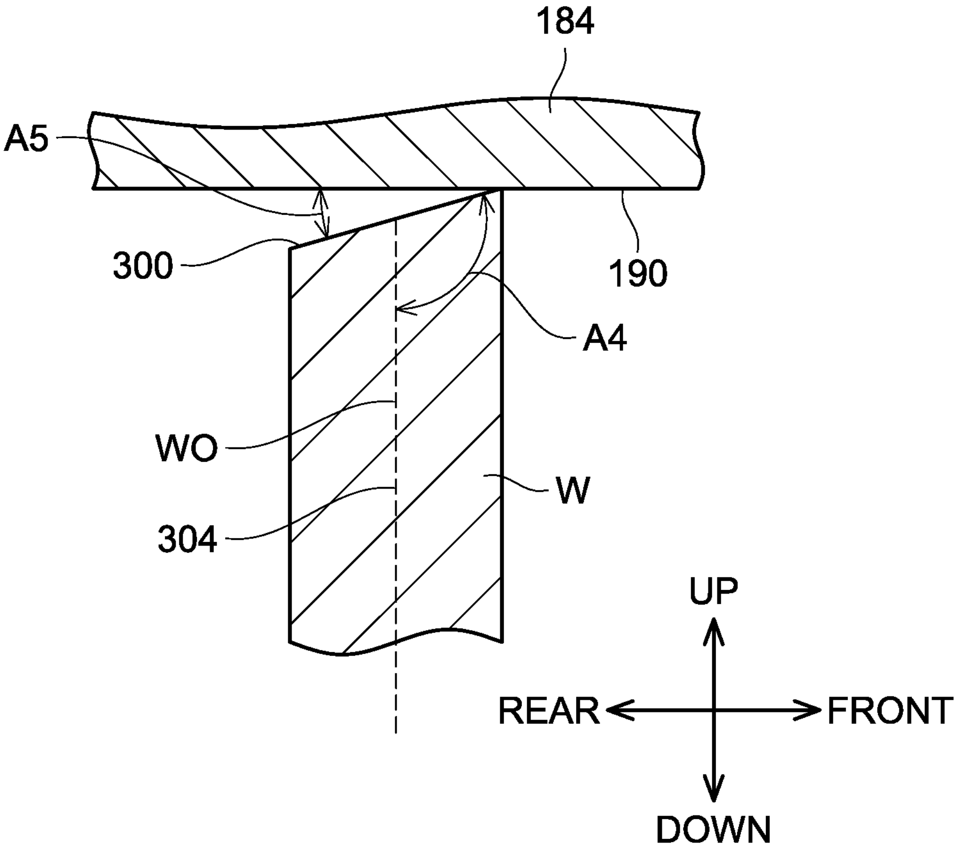
FIG. 18 illustrates an enlarged cross-sectional view of the wire tip guiding surface 190 according to the second embodiment when the wire tip guiding surface 190 is in contact with a tip of the wire W.

As shown in FIG. 18, the tip of the wire W comprises a wire tip surface 300. The wire tip surface 300 is inclined relative to a longitudinal axis 304 of the wire W. An inclination angle A4 of the wire tip surface 300 relative to the longitudinal axis 304 is greater than 90 degrees. The inclination angle A4 is an angle which is measured between the wire tip surface 300 and the longitudinal axis 304 when the wire W is divided in halves with a plane including the longitudinal axis 304. The inclination angle A4 is an angle obtained by 90 degrees added to an angle between the wire tip surface 300 and a cutting plane when the wire W is cut in the cutting plane perpendicular to the longitudinal axis 304. Also, the inclination angle A4 may be 95 degrees or more. In the present embodiment, the inclination angle A4 is 100 degrees. The tip of the wire W is steep at an acute angle. The wire tip surface 300 is formed by the wire W being cut by the first cutter 70 and the second cutter 72.

Figure 19:
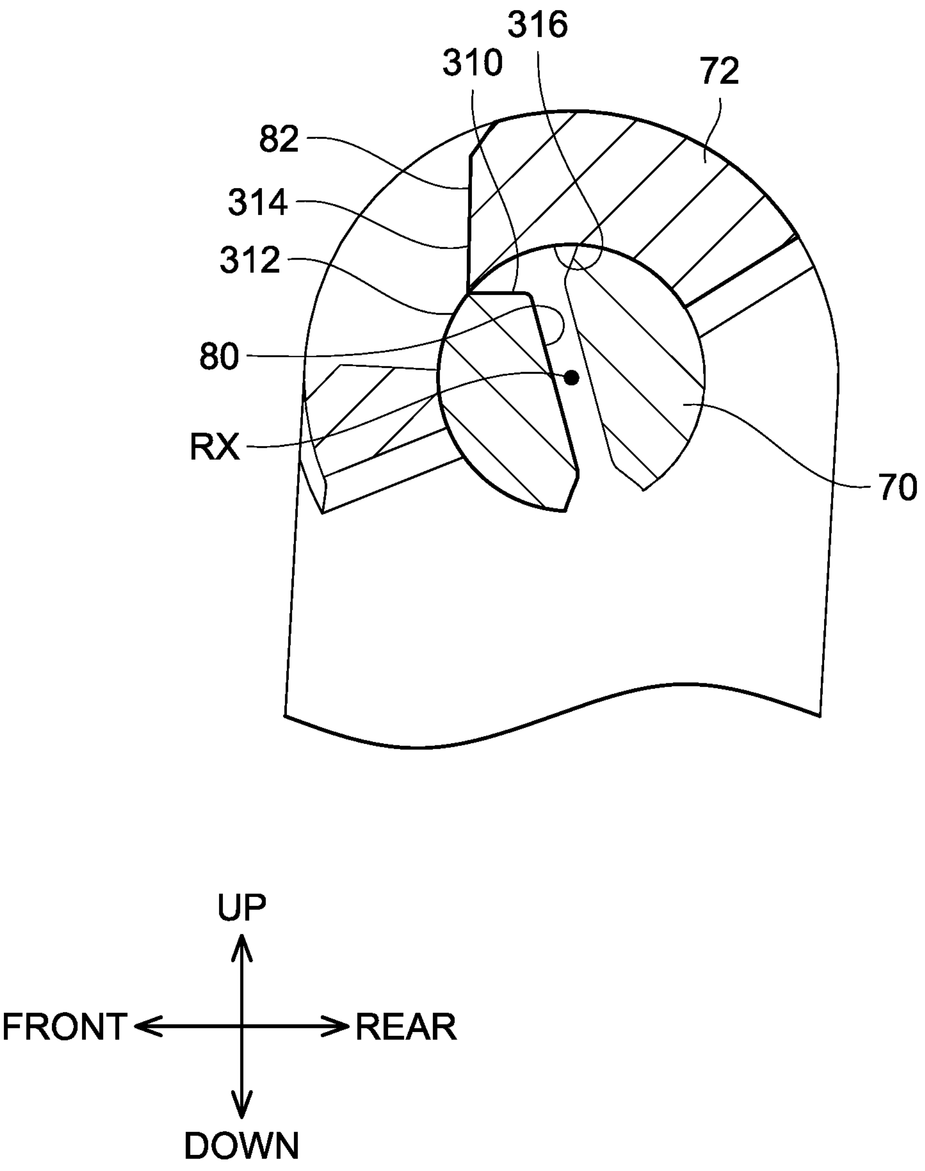
FIG. 19 illustrates a cross-sectional view of a first cutter 70 and a second cutter 72 according to a second embodiment.

As shown in FIG. 19, a pivot axis RX of the second cutter 72 passes in the first cutting opening 80 of the first cutter 70. A part of the first cutting opening 80 is defined by a first cutting surface 310. The first cutting surface 310 is located at an end closer to the second cutting opening 82 of the first cutting opening 80. The first cutting surface 310 is connected to an outer peripheral surface 312 of the first cutter 70. The first cutting surface 310 is substantially perpendicular to a longitudinal direction of the first cutting opening 80. A part of the second cutting opening 82 of the second cutter 72 is defined by a second cutting surface 314. The second cutter 72 comprises a facing surface 316 which faces the outer peripheral surface 312 of the first cutter 70, and the second cutting surface 314 is connected with the facing surface 316. An angle formed by the second cutting surface 314 and the facing surface 316 is an acute angle, and is for example 70 degrees or less. The wire W is cut by being sandwiched between the first cutting surface 310 and the second cutting surface 314.

Figure 20:
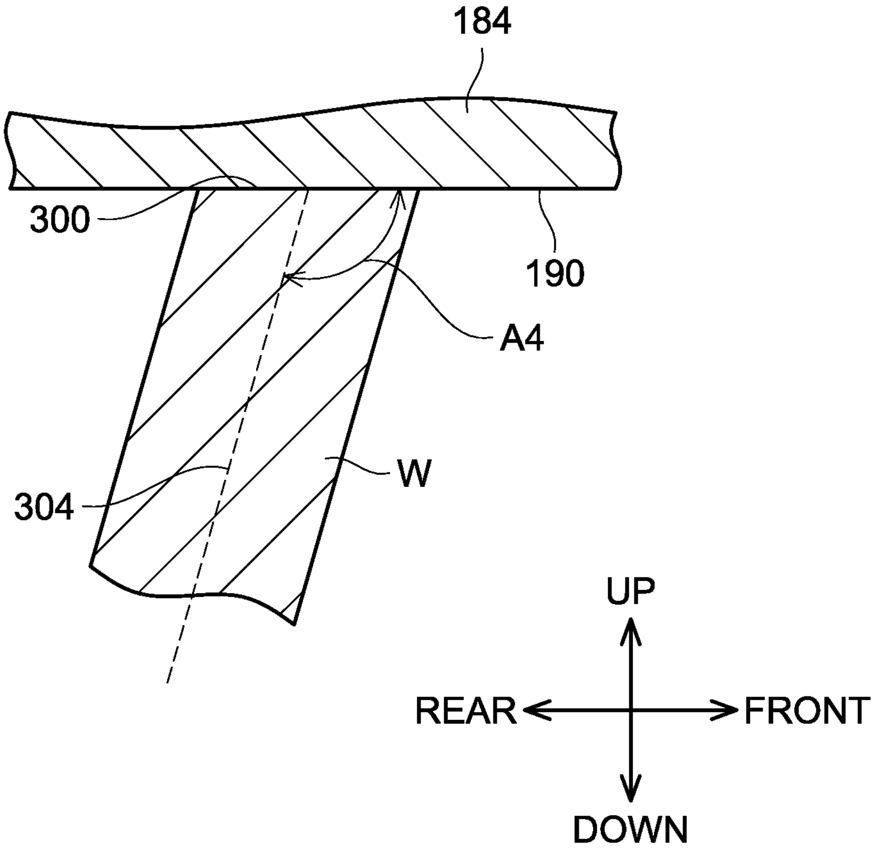
FIG. 20 illustrates an enlarged cross-sectional view of the wire tip guiding surface 190 according to the second embodiment when the wire tip guiding surface 190 is in contact with a wire tip surface 300.

How the tip of the wire W moves on the wire tip guiding surface 190 will be described. As shown in FIG. 18, the wire tip surface 300 is inclined relative to the wire tip guiding surface 190 when a corner of the tip of the wire W is in contact with the wire tip guiding surface 190. An inclination angle A5 of the wire tip surface 300 relative to the wire tip guiding surface 190 is greater than zero degrees. The inclination angle A5 is an angle measured between the wire tip guiding surface 190 and the wire tip surface 300. Also, the inclination angle A5 may be 5 degrees or more. In the present embodiment, the inclination angle A5 is 10 degrees. As shown in FIG. 20, next, the wire tip surface 300 makes contact with the wire tip guiding surface 190 by its surface. At this occasion, the longitudinal axis 304 of the wire W is inclined relative to the wire tip guiding surface 190 by the inclination angle A4. Next, as shown in FIG. 17, the wire tip surface 300 moves on the wire tip guiding surface 190 from rear to front in a moving direction D6. At this occasion, the wire tip surface 300 moves in the direction approaching the rebars R. After the wire tip surface 300 has moved on the wire tip guiding surface 190, the wire tip surface 300 makes contact with the guarding surface 196. Due to this, as shown in FIG. 16, after the wire W has been twisted, the wire-tip protruding height L1 of the wire W in the present embodiment is shorter than the wire-tip protruding height L2 in the first and second comparative examples.

Third Embodiment

Figure 21:
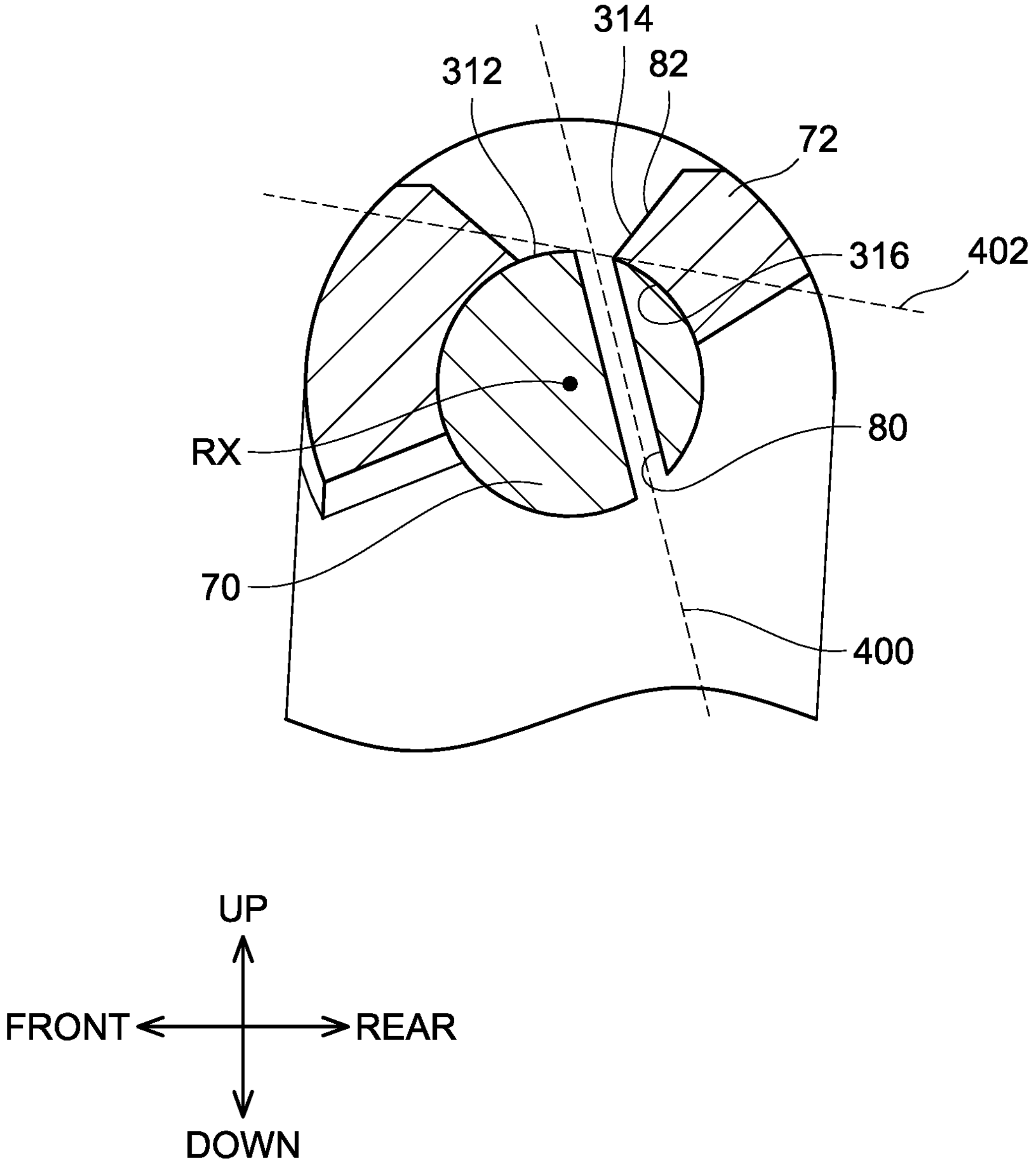
FIG. 21 illustrates a cross-sectional view of a first cutter 70 and a second cutter 72 according to a third embodiment.

Only the differences from the second embodiment will be described. In the third embodiment, as shown in FIG. 21, the first cutting opening 80 of the first cutter 70 is offset from the pivot axis RX of the second cutter 72. The first cutting opening 80 is disposed on the rear side relative to the pivot axis RX. The first cutting opening 80 extends linearly. A central axis 400 of the first cutting opening 80 is inclined at an acute angle relative to a tangent line 402 at an intersecting point between the central axis 400 and the outer peripheral surface 312 of the first cutter 70. The wire tip surface 300 (see FIG. 18) is inclined relative to the longitudinal axis 304 (see FIG. 18) of the wire W by the wire W being sandwiched to be cut between the first cutting surface 310 and the second cutting surface 314.

(Variants)

In an embodiment, the push member 110 may be configured to operate a configuration other than the cutting unit 44.

In an embodiment, the push member 110 may be attached to the outer sleeve 106 with a member such as screw(s).

In an embodiment, the grip portion 16 may extend in the left-right direction.

In an embodiment, the rebar tying tool 2 may comprise a power cord connectable to an external power source, instead of the battery pack BP. In this case, the rebar tying tool 2 operates with power supplied via the power cord from the external power source.

In an embodiment, the reel accommodating portion 22 may be arranged at a rear end of the twisting unit accommodating portion 14.

In an embodiment, the grasping unit 64 may comprise a pair of hook members configured to open and close. In this case, the pair of hook members may be configured to grasp the wire W when they close and to release the wire W when they open.

In an embodiment, the outer sleeve 106 and the fin member 108 may be integrally formed. Thus, the fin member 108 may rotate together with the outer sleeve 106. In other words, the fin member 108 may not be configured to rotate relative to the outer sleeve 106. In this configuration, the base portion 130 of the fin member 108 may be disposed on the front side relative to the fin portions 132 of the fin member 108. Further, the outer sleeve 106 may only comprise the cylindrical portion 124 and may not comprise the flange portion 126. The push member 110 may be attached to the outer sleeve 106 by having the outer sleeve 106 inserted into the push member 110 from the front end of the outer sleeve 106. A rear surface of the push member 110 may be in contact with a front surface of the base portion 130.

The base portion 130 may be an example of a flange portion. By the push member 110 contacting the front surface of the base portion 130, rearward movement of the push member 110 relative to the outer sleeve 106 may be restricted. A front surface of the push member 110 may be in contact with a circlip fixed to the cylindrical portion 124. By the push member 110 contacting the circlip, frontward movement of the push member 110 relative to the outer sleeve 106 may be restricted.

What is claimed is:

1. A rebar tying tool configured to tie rebars with a wire, the rebar tying tool comprising:
- a screw shaft configured to rotate;
- a sleeve through which the screw shaft is inserted, and configured to move in a front-rear direction and rotate;
- a fin member attached to the sleeve and configured to permit and prohibit rotation of the sleeve;
- a push member attached to the sleeve and configured to rotate about the sleeve, wherein the push member does not rotate along with the rotation of the sleeve;
- an operated unit having a longitudinal direction in the front-rear direction and configured to be operated by the push member when the sleeve moves in the front-rear direction; and
- a grasping unit protruding from a front part of the sleeve, configured to rotate with the sleeve, and configured to grasp the wire, wherein
- the operated unit comprises:
  - an operated member which the push member is configured to contact and configured to be operated by the push member when the push member is in contact with the operated member, and
  - a cutter configured to cut the wire and work when the operated member is operated by the push member,
- the grasping unit comprises a first member and a second member,
- the grasping unit is configured to switch between a first state where the first member and the second member do not grasp the wire and a second state where the first member and the second member grasp the wire according to movement of the sleeve in the front-rear direction,
- the push member comprises a front surface configured to contact the operated member, and
- the front surface of the push member is disposed in front of a front end of the fin member.

2. The rebar tying tool according to claim 1, wherein the operated unit further comprises a link member connecting the operated member and the cutter.

3. The rebar tying tool according to claim 2, further comprising a trigger configured to be pushed into by a user, wherein
- the sleeve comprises:
  - a cylindrical portion, and
  - a flange portion protruding from an outer peripheral surface of the cylindrical portion,
- the push member is clamped between a rear end of the flange portion of the sleeve and the front end of the fin member in the front-rear direction, and
- an upper end of the trigger is disposed higher than a lower end of the operated unit.

4. The rebar tying tool according to claim 1, wherein the sleeve comprises:
- a cylindrical portion, and
- a flange portion protruding from an outer peripheral surface of the cylindrical portion, and
- the push member is clamped between a rear end of the flange portion of the sleeve and the front end of the fin member in the front-rear direction.

5. The rebar tying tool according to claim 1, further comprising a trigger configured to be pushed into by a user, wherein
- an upper end of the trigger is disposed higher than a lower end of the operated unit.

6. A rebar tying tool configured to tie rebars with a wire, the rebar tying tool comprising:
- a screw shaft configured to rotate;
- a sleeve through which the screw shaft is inserted, and configured to move in a front-rear direction and rotate;
- a fin configured to rotate with the sleeve;
- a push member attached to the sleeve and configured to rotate about the sleeve, wherein the push member does not rotate along with the rotation of the sleeve;
- an operated unit having a longitudinal direction in the front-rear direction and configured to be operated by the push member when the sleeve moves in the front-rear direction; and
- a grasping unit protruding from a front part of the sleeve, configured to rotate with the sleeve, and configured to grasp the wire, wherein
- the operated unit comprises:
  - an operated member which the push member is configured to contact and configured to be operated by the push member when the push member is in contact with the operated member, and
  - a cutter configured to cut the wire and work when the operated member is operated by the push member,
- the grasping unit comprises a first member and a second member,
- the grasping unit is configured to switch between a first state where the first member and the second member do not grasp the wire and a second state where the first member and the second member grasp the wire according to movement of the sleeve in the front-rear direction,
- the push member comprises a front surface configured to contact the operated member, and
- the front surface of the push member is disposed on a front side relative to in front of a front end of the fin.

7. The rebar tying tool according to claim 6, wherein
- the sleeve comprises: a cylindrical portion; and a flange portion protruding from an outer peripheral surface of the cylindrical portion,
- the push member is disposed on the cylindrical portion,
- the movement of the push member relative to the sleeve is restricted by the push member contacting the flange portion, and
- the push member is clamped between a rear end of the flange portion of the sleeve and the front end of the fin in the front-rear direction.

* * * * *